US011027652B2

(12) United States Patent
Zafeirakis

(10) Patent No.: US 11,027,652 B2
(45) Date of Patent: Jun. 8, 2021

(54) VEHICLE COLLISION AVOIDANCE SYSTEM

(71) Applicant: Georgios Zafeirakis, Glyfada (GR)

(72) Inventor: Georgios Zafeirakis, Glyfada (GR)

( * ) Notice: Subject to any disclaimer, the term of this patent is extended or adjusted under 35 U.S.C. 154(b) by 0 days.

(21) Appl. No.: 16/592,673

(22) Filed: Oct. 3, 2019

(65) Prior Publication Data

US 2020/0031278 A1    Jan. 30, 2020

Related U.S. Application Data

(63) Continuation-in-part of application No. 15/983,126, filed on May 18, 2018, now Pat. No. 10,434,947.

(60) Provisional application No. 62/508,678, filed on May 19, 2017, provisional application No. 62/536,488, filed on Jul. 25, 2017.

(51) Int. Cl.
| | |
|---|---|
| *B60Q 9/00* | (2006.01) |
| *B60R 1/00* | (2006.01) |
| *B60R 1/02* | (2006.01) |
| *B60Q 1/34* | (2006.01) |
| *B60R 21/015* | (2006.01) |
| *B60R 1/12* | (2006.01) |
| *H04N 7/18* | (2006.01) |
| *H04N 5/232* | (2006.01) |
| *H04N 5/262* | (2006.01) |

(52) U.S. Cl.
CPC ............. *B60Q 9/008* (2013.01); *B60Q 1/346* (2013.01); *B60R 1/002* (2013.01); *B60R 1/007* (2013.01); *B60R 1/025* (2013.01); *B60R 1/12* (2013.01); *B60R 21/01552* (2014.10); *H04N 5/23296* (2013.01); *H04N 5/2628* (2013.01); *H04N 7/18* (2013.01); *B60R 2001/1253* (2013.01); *B60R 2300/105* (2013.01); *B60R 2300/202* (2013.01); *B60R 2300/302* (2013.01); *B60R 2300/602* (2013.01); *B60R 2300/804* (2013.01); *B60R 2300/8026* (2013.01); *B60R 2300/8066* (2013.01)

(58) Field of Classification Search
CPC .......... B60Q 9/00; B60Q 9/008; B60Q 9/009; B60Q 1/54; B60Q 1/323; B60Q 1/346; B60Q 1/503; B60R 1/002; B60R 1/007; B60R 1/025; B60R 1/06; B60R 1/12; H04N 5/2628; H04N 5/23296
See application file for complete search history.

(56) References Cited

U.S. PATENT DOCUMENTS

| | | | | |
|---|---|---|---|---|
| 2005/0273263 | A1* | 12/2005 | Egami | G08G 1/163 |
| | | | | 701/301 |
| 2008/0169938 | A1* | 7/2008 | Madau | B60R 1/12 |
| | | | | 340/901 |
| 2009/0096937 | A1 | 4/2009 | Bauer | |

(Continued)

*Primary Examiner* — Sultan Chowdhury
(74) *Attorney, Agent, or Firm* — Franco S. De Liguori; DP IP Group

(57) ABSTRACT

A vehicle collision avoidance system has a side-view camera positioned on a side portion of a vehicle and configured to present a driver with a rear side view exterior to the vehicle. A display is coupled to the side-view camera and disposed in view of the driver to output a video stream from the side-view camera. A turn signal sensor is configured to detect activation of a turn signal. A controller is configured to receive signals from the turn signal sensor and to adjust a field of view of the side-view camera based on activation of the turn signal.

25 Claims, 20 Drawing Sheets

(56) References Cited

U.S. PATENT DOCUMENTS

| | | |
|---|---|---|
| 2010/0177412 A1 | 7/2010 | Lee |
| 2011/0115615 A1 | 5/2011 | Luo |
| 2012/0200705 A1 | 8/2012 | Saigusa |
| 2013/0155534 A1* | 6/2013 | Sala ................. B60R 1/072 |
| | | 359/843 |
| 2016/0001781 A1 | 1/2016 | Fung |
| 2017/0015248 A1* | 1/2017 | Baur .................. B60R 1/00 |
| 2017/0136976 A1 | 5/2017 | Ohno |
| 2017/0232898 A1 | 8/2017 | Maejima |
| 2017/0336515 A1* | 11/2017 | Hosoya ............... G01S 19/49 |
| 2018/0160030 A1* | 6/2018 | Chaney, Jr. ........... B60R 1/06 |
| 2018/0288848 A1* | 10/2018 | Gao .................. H04N 7/183 |

* cited by examiner

PRIOR ART
FIGURE 9
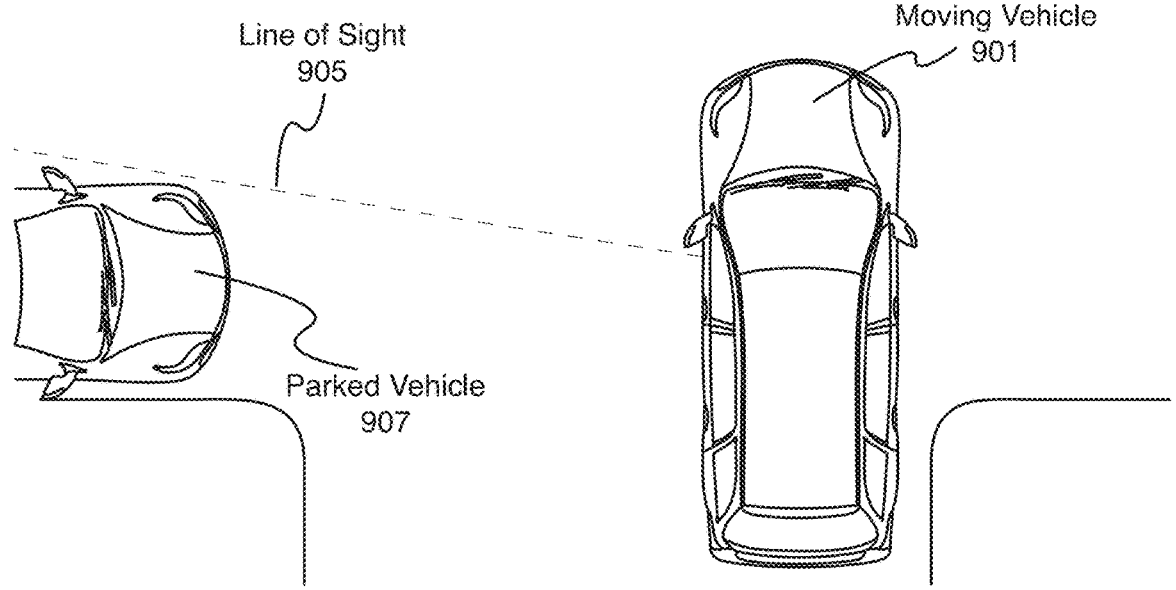

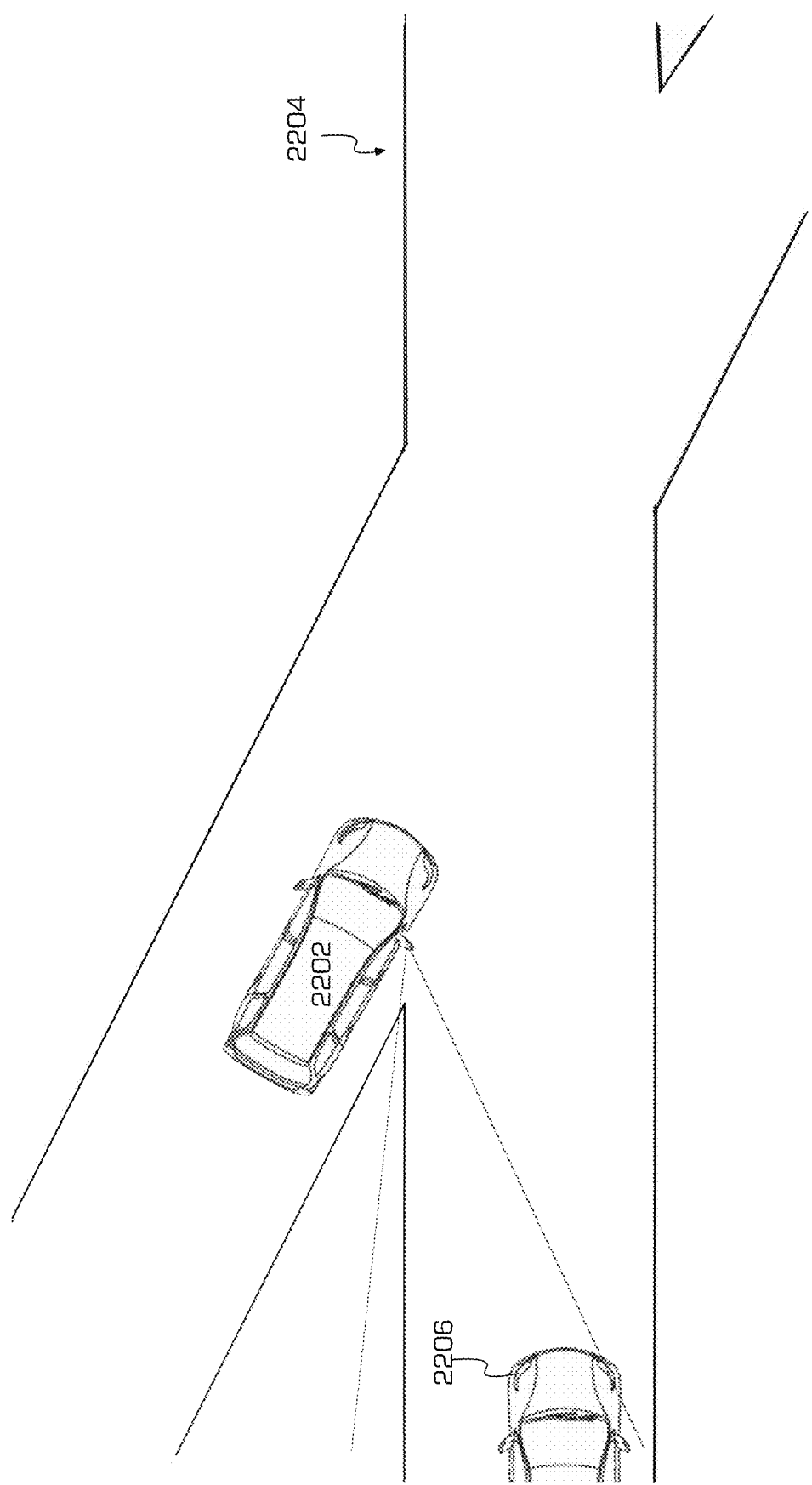

VEHICLE COLLISION AVOIDANCE SYSTEM

RELATED APPLICATIONS

This application is a continuation-in-part of U.S. patent application Ser. No. 15/983,126, filed May 18, 2018, now U.S. Pat. No. 10,434,947, which claims priority from U.S. Provisional Patent Application Nos. 62/508,678, filed May 19, 2017 and 62/536,488, filed Jul. 25, 2017, and which are incorporated herein by reference in their entirety.

BACKGROUND OF THE DISCLOSURE

Field of the Disclosure

The present disclosure relates generally to vehicle collision avoidance systems. More specifically, the present disclosure relates to a vehicle collision avoidance system providing front blind spot assistance, side-view blind spot assistance and rearview parking assistance.

Description of the Related Art

Due to the general shape of most automobiles, trucks, heavy machinery, ships, etc., significant blind spots exist for the driver. For example, the driver is generally positioned several feet behind the front bumper of the vehicle in order to accommodate the engine compartment. However, positioning the driver away from the front of the vehicle creates a situation where the driver needs to advance the front portion of the vehicle into an intersection in order to observe oncoming traffic before proceeding across the intersection.

As shown in FIG. 9 representing the prior art, the driver of moving vehicle 901 must move into the intersection 903 in order to have a line of sight 905 that clears a parked vehicle 907. However, in moving into the intersection 903, the driver exposes a significant portion of the front end of the moving vehicle 901 to oncoming traffic. In this situation the moving vehicle 901 risks a collision with an oncoming vehicle if the driver of the oncoming vehicle is distracted or otherwise unable to swerve around the moving vehicle 901.

SUMMARY OF THE DISCLOSURE

This disclosure provides safety and eliminates the stress of the driver allowing him to judge when it is the right time to cross a junction or enter a street with limited side visibility, by enhancing driver's awareness with automation.

An object of the present disclosure is to mitigate the danger of a collision between a vehicle entering an intersection and oncoming traffic.

Another object of the present disclosure is to facilitate reverse parking maneuvers with a vehicle.

Another object of the present disclosure is to facilitate reverse driving maneuvers with a vehicle.

Another object of the present disclosure is to facilitate lane change maneuvers with a vehicle.

Another object of the present disclosure is to facilitate parallel parking maneuvers with a vehicle.

An embodiment of the present disclosure is a vehicle collision avoidance system having: a camera disposed on a vehicle and arranged to monitor at least one collision prone region adjacent to the vehicle; a sensor positioned within the vehicle and arranged to determine a driver's head position relative to a designated point in the vehicle; a display disposed in view of the driver, the display coupled to the camera; and a controller configured to control operation of the sensor, the camera and the display. The controller activates the display and the camera to display the at least one collision prone region adjacent to the vehicle when the sensor detects that the driver's head is beyond a threshold distance from the designated point.

Additionally, the camera is a wide field of view camera disposed on a rear area of the vehicle and arranged to image an area near a rear bumper and a portion of the bumper of the vehicle.

In an embodiment of the present disclosure, a normal field of view camera is disposed on a rear area of the vehicle and arranged to image an area behind the vehicle, the normal field of view camera being coupled to the display and operationally controlled by the controller.

The normal field of view camera and the wide field of view camera are provided in a single camera with a field of view adjustable by the controller.

In an embodiment of the present disclosure, the vehicle collision avoidance system has an electronically adjustable side-view mirror. The side-view mirror is controllably adjusted by the controller in response to the driver's head position. One or more side-view mirrors controllably adjustable by the controller may be provided on the vehicle.

In an embodiment of the present disclosure, the camera is disposed at a forward area of the vehicle and arranged to image a region encompassing both sides of the vehicle forward of a front of the vehicle.

An embodiment of the present disclosure is a vehicle collision avoidance method for a motor vehicle. The method includes the steps of: detecting a body movement by a driver; evaluating the body movement to determine if the body movement exceeds a threshold distance; and activating a collision avoidance process when the body movement exceeds the threshold distance. The body movement is a forward-leaning movement, and the threshold distance is measured from a driver's seat headrest.

Additionally, the collision avoidance process also includes the steps: detecting whether the motor vehicle is in a forward gear; activating a front-view camera when the motor vehicle is in neutral or a forward gear; and transmitting a video signal from the front-view camera to a display viewable by the driver. The front-view camera has at least a 180° field of view forward of the motor vehicle. Alternatively, the front-view camera includes a plurality of cameras configured to provide the 180° field of view.

Another embodiment of the present disclosure is a collision avoidance process that includes the steps: detecting whether the motor vehicle is in a reverse gear; activating a rear-view camera when the motor vehicle is in a reverse gear; and transmitting a video signal from the rear-view camera to a display viewable by the driver. The rear-view camera is configured to provide a view behind the motor vehicle.

The embodiment further includes the steps: processing the video signals to provide a normal field of view to the driver when the body motion is less than the threshold distance and greater than a second threshold distance; and processing the video signals to provide a wide field of view to the driver when the body motion exceeds the threshold distance.

Additionally, an embodiment of the present disclosure includes adjusting one or more side-view mirrors to provide a rear parking view to the driver when the body motion exceeds the threshold distance; and adjusting the side-view mirror to provide a normal driving view to the driver when the body motion is less that the threshold distance and greater than the second threshold distance.

In another embodiment of the present disclosure, a vehicle collision avoidance system is provided that includes: a side-view camera positioned on a side portion of a vehicle, the side-view camera configured to present a driver with a rear side view exterior to the vehicle; a display coupled to the side-view camera and disposed in view of the driver to output a video stream from the side-view camera; a turn signal sensor configured to detect activation of a turn signal; and a controller configured to receive signals from the turn signal sensor, and adjust a field of view of the side-view camera based on activation of the turn signal.

In yet another embodiment of the present disclosure, a vehicle collision avoidance system is provided that includes: a side-view mirror positioned on a side portion of a vehicle, the side-view mirror configured to present a driver with a rear side view exterior to the vehicle; a motor coupled to the side-view mirror and configured to controllably adjust an angle of the side-view mirror; a turn signal sensor configured to detect activation of a turn signal; and a controller configured to receive signals from the turn signal sensor, and control the motor to adjust an angle of the side-view mirror based on activation of the turn signal.

In another embodiment of the present disclosure, a vehicle collision avoidance method for a motor vehicle is provided that includes: evaluating a detected deliberate body movement of a driver to determine if the deliberate body movement exceeds a threshold value; detecting activation of a turn signal; and adjusting a side view along an exterior rearward facing side of the vehicle presented to the driver in response to the deliberate body movement exceeding the threshold value and activation of the turn signal.

In a still further embodiment of the present disclosure, a vehicle collision avoidance system is provided that includes a first sensor configured to determine deliberate body movement; a second sensor configured to detect a transmission gear selection; a third sensor configured to sense a traveling velocity of the vehicle; a turn signal sensor configured to detect activation of a turn signal; a first camera system positioned at a front-most position on the vehicle and oriented to image an area encompassing at least 180° around the front of said vehicle; a second camera system positioned at a rear-most position on the vehicle; a first display adapted to display video from the first camera and the second camera to the driver; and a side-view camera positioned on a side portion of a vehicle. The side-view camera is configured to present a driver with a rear side view exterior to the vehicle. Also, a second display is coupled to the side-view camera and disposed in view of the driver to output a video stream from the side-view camera. A controller is also provided and configured to: interpret received signals from the first sensor, the second sensor, and the third sensor; select a video feed from at least one of the first camera and the second camera based on the received signals; display the video feed on the first display; and adjust a field of view of the side-view camera based on activation of the turn signal and the received signals.

BRIEF DESCRIPTION OF THE DRAWINGS

These and other features, aspects and advantages of the present disclosure will become better understood with regard to the following description, appended claims and accompanying drawings wherein:

FIG. 9 illustrates a vehicle entering an intersection, in accordance with the prior art;

FIG. 22 illustrates an elevated view of vehicles on a road, in accordance with an embodiment of the present disclosure.

DETAILED DESCRIPTION OF THE DISCLOSURE

The present disclosure includes three main components (also referred to herein as "system" or "systems"), which combine to provide a comprehensive collision avoidance system: a Forward Blind Spot Assistance (FBSA) component reduces the risk of collision while a driver is attempting to traverse an intersection; a Side-View Blind Spot Assistance—e.g., lane change blind spot assistance (LCBSA)—component reduces the risk of a collision occurring during a lane change and assists in parallel parking; and a Rear View Parking Assistance (RVPA) component allows drivers to safely maneuver a vehicle in reverse, whether for the purpose of backing into a parking spot, parallel parking, or reversing out of a parking spot. While embodiments described herein refer to collision avoidance systems that include the Forward Blind Spot Assistance component, Side-View Blind Spot Assistance component and Rear View Parking Assistance component, one of ordinary skill in the art may readily implement either component individually without departing from the intent of the present disclosure.

Figure 15:
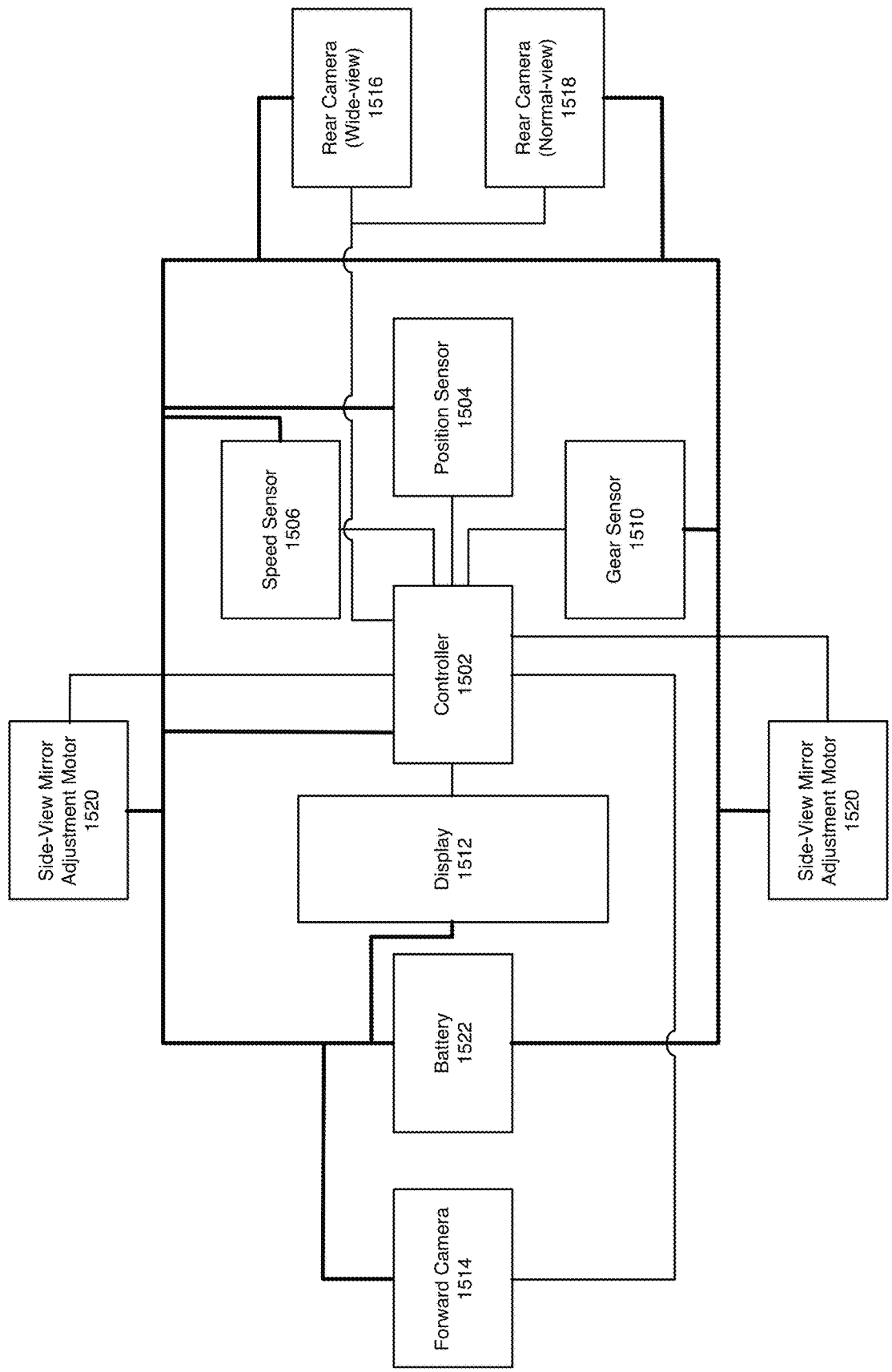
FIG. 15 illustrates a block representation of an embodiment of the present disclosure.

FIG. 15 shows an embodiment of a vehicle collision avoidance system according to the present disclosure. The vehicle collision avoidance system includes a controller 1502 configured to control the various sensors, cameras, motors and display as well as execute a vehicle collision avoidance method, as described herein below. Additionally, the system shown in FIG. 15 includes at least one position sensor 1504, at least one speed sensor 1506, and at least one gear sensor 1510 coupled to the controller 1502. The controller 1502 is also coupled to a display 1512 that is configured to switchably display video imaged by at least one forward camera 1514, at least one rear camera (Wide-view) 1516 and at least one rear camera (Normal-view) 1518. Additionally, the controller 1502 is coupled to side-view mirror adjustment motors 1520. Further, the system shown in FIG. 15 is equipped with a battery 1522 configured to provide energizing power to the various components described above.

The rear camera (Wide-view) 1516 is configured and oriented to image a close in region to the rear bumper as well as imaging the entire length of the rear bumper. In order to accomplish this, the rear camera (Wide-view) 1516 is angled at a downward angle of 45°±10°. At this angle, the driver receives a nearly top-down view near the bumper that allows for closer approaches to obstacles. The driver can safely come very close (few inches) to other cars or obstacles without risk. The wide view helps the driver while exiting a parking place in reverse gear. If other cars or buildings are blocking the driver's view, the close view wide angle camera shows everything that lies on the right and left side behind the car.

The rear camera (Normal-view) 1518 provides a rearward view similar to the view a driver would have by turning to look rearward or if the driver looked at a rearview mirror.

In the embodiment shown in FIG. 15, the position sensor 1504 may include a calibration feature that may be hardware implemented, such as with potentiometers, or software implement, such that the controller provides the driver with a calibration interface on the display 1512. The calibration feature allows the driver to fine tune the position sensor 1504 so that the position sensor 1504 properly interprets the driver's intentions.

Moreover, the system shown in FIG. 15 may include one or more accessory ports (not shown) coupled to the controller 1502. The accessory port protocol may be selected, for example, from USB, serial, IEEE 1394 (i.e., Firewire), IEEE 802.3af (i.e., Power over Ethernet), IEEE 802.11-2016 (i.e., Wi-Fi), Bluetooth, Thunderbolt, or a combination of these interfaces. The one or more accessory ports are coupled to the controller 1502 such that the controller 1502 can control accessory devices connected by way of the accessory port based on the driver's movements.

Thus, when the position sensor 1504 is an image sensor and the controller 1502 is configured to apply a "body language" deciphering algorithm to the driver's motion patterns and gestures, the controller 1504 will be able to provide additional functionality based on the driver's movements and gestures, and the accessory devices connected through the accessory ports.

Forward Blind Spot Assistance (FBSA)

The present disclosure provides the driver of the vehicle with a clear and expanded visual field of moving objects in intersections, without having to enter the intersection.

Many drivers face difficulty when crossing an intersection or exiting a parking spot, due to parked vehicles, walls, big objects or traffic blocking the driver's view. Consequently, a driver will need to enter the intersection to have better visibility. However, by increasing the driver's visibility along the intersection, the driver exposes a significant portion of the front of the vehicle to oncoming traffic. This could potentially lead to an accident as oncoming traffic may not have time and space to avoid the front of the vehicle intending to cross the intersection (See: FIG. 9).

Figure 11:
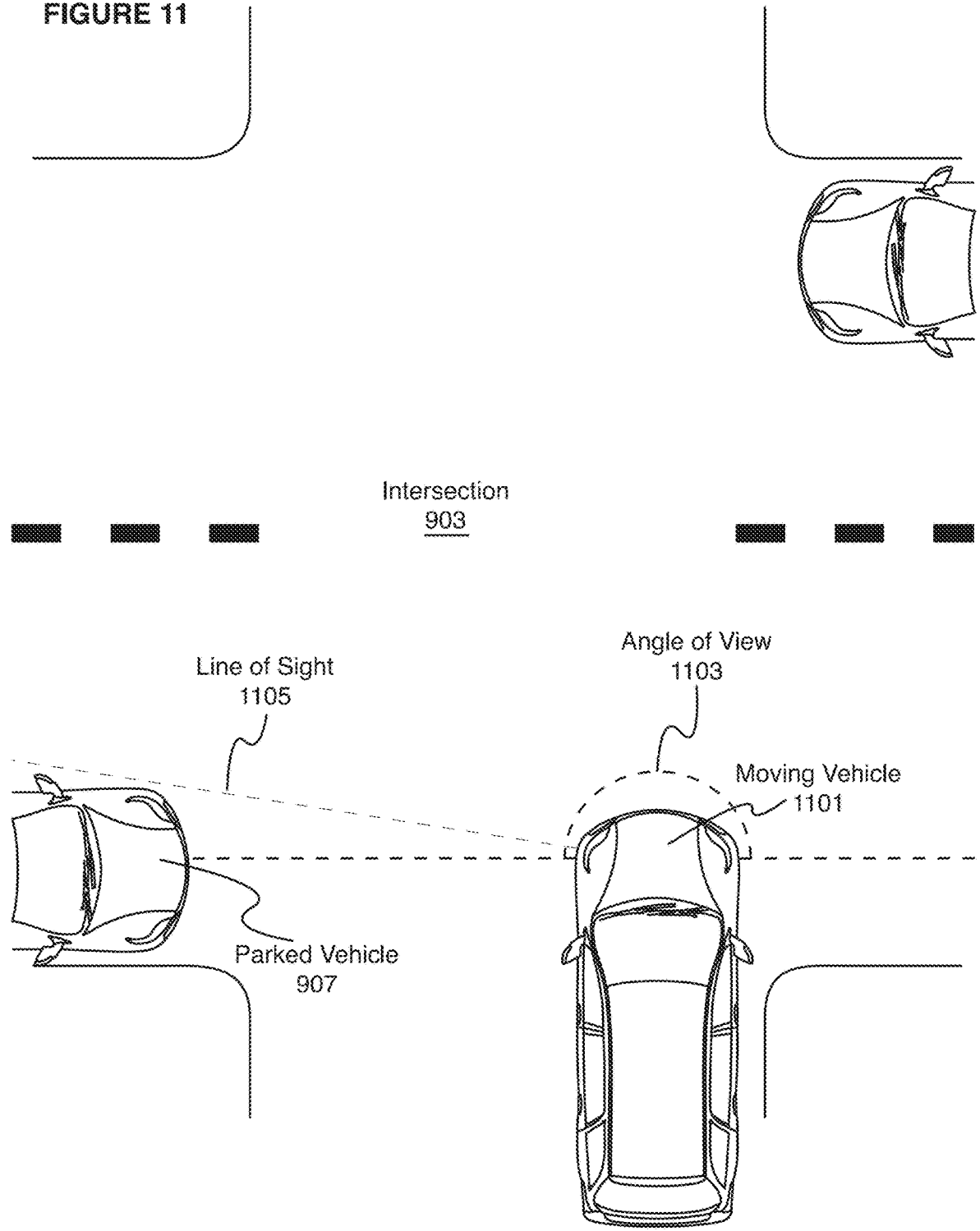
FIG. 11 illustrates a vehicle entering an intersection, in accordance with an embodiment of the present disclosure.

FIG. 11 is a detailed enlargement of the driver's optical field on both sides of the intersection as the vehicle enters the intersection. By placing one or more cameras at the front end of a vehicle 1101, the driver will have an expansive, at least 180°, viewing angle 1103 within an intersection 903 without the vehicle 1101 having to enter the intersection 903 or proceed beyond parked vehicles 907. Consequently, the driver is at a significantly reduced risk of collision with oncoming traffic.

The present disclosure utilizes a driver's natural movement to lean forward in order to achieve a better view of the obstacles to trigger the operation of the vehicle collision avoidance system, i.e., the Forward Blind Spot Assistance system and the Rear View Parking Assistance system. Depending on whether the vehicle is in neutral, forward gear, or reverse gear will determine whether the present disclosure will activate the Forward Blind Spot Assistance system or the Rear View Parking Assistance system once the driver has leaned forward by a predetermined amount.

The present disclosure consists of a camera system, which enlarges the driver's front visual field and a controller that activates the system by receiving signals by one or more sensors placed on the driver's headrest/seat or another appropriate place inside the vehicle. The controller who receives signals from the sensors recognizes the driver's motion relatively to the driver's headrest/seat and activates or deactivates the FBSA and displays a real-time video of the camera system, which is mounted on the vehicle's front hood/grill/bumper/lights/fenders in the vehicle's monitor, accordingly.

The FBSA contains a camera system with one the following layouts:

(1) a 180 degrees(minimum) camera for the front and side view;
(2) two cameras system, one for the right-front side of the vehicle and one for the left-front side of the vehicle; and
(3) a wide-angle view angle camera which provides a wide range picture, more than a monitor can show and the controller's software will choose the appropriate framing and zooming for the optimum results.

One or more sensors placed on the back of the seat (or other suitable location) detect the movement relative to the seat's back or headrest. When the driver moves his head/upper body or performs body gestures, the sensor perceives the "body language" of the driver and sends information to the controller, which compares the driver's movement to the predefined body gestures and determines how to react. The controller activates the camera system and monitor to provide the driver with a view of the front and side view.

The present disclosure is a system that provides optical feedback to the driver in case obstacles are blocking the view to the left or/and right side of the vehicle.

The FBSA helps to increase safety level by providing adequate visible field when the vehicle is approaching a junction or exiting parking spots or any other situation that the driver is not sure if it is safe to move forward.

The distance between the driver's head (eyes) and the vehicle's front end is a total of the distance between the driver's head and the lowest part of the windshield, plus the length of the hood plus the length of the grill/bumper. As a result, the driver's eyes are situated 1 m to 3 m (e.g., 2.6 m for BMW Z4) behind the vehicle's front bumper. This distance varies by vehicle model and body type, as sport vehicles have long hood and the driver's position is low while Sport Utility Vehicles (SUV) tend to have a shorter hood and higher driving position.

Consequently, when an obstacle is blocking the driver's view, the driver is forced to drive forward until his head has clear side view, but at the same time part of the vehicle has moved into the junction with risk of side impact with, for example, a vehicle, bicycle or motorcycle.

In case of approaching a junction where visibility is limited due to obstacles, the driver's natural reaction is to lean forward to improve visibility by altering his view angle. As a result, the distance between driver's torso/head and the back of the seat is increased.

Referring again to FIG. 15, the controller 1502 coupled to the position sensor 1504 installed inside the cabin monitors the natural reactions of the driver to determine the driver's intent. The position sensor 1504 provides measurements regarding the driver's position relatively to the vehicle seat/headrest. The position sensor 1504 may be a proximity sensor that registers distance between itself and an object (i.e., the driver) or the position sensor 1504 may be an image sensor, such as a CCD sensor or a CMOS sensor, configured to register the driver's posture, arm and hand gestures, and head movements. The image sensor may further be configured to identify eye movements.

When the position sensor 1504 is an image sensor, the controller 1502 can be configured to apply a "body language" deciphering algorithm to the driver's motion patterns and gestures. As a consequence, the controller 1504 will be able to provide additional functionality based on the driver's movements and gestures.

Moreover, the controller receives data from a speed sensor 1506 coupled to the driveshaft (not shown), or other appropriate structure, and a gear sensor 1510 coupled to the vehicle's transmission, or other appropriate structure. The speed sensor 1506 provides the controller 1502 with data regarding the vehicle's current velocity. The gear sensor 1510 provides data to the controller 1502 regarding whether the vehicle is in a reverse gear or a non-reverse gear (i.e., neutral or a forward gear). The controller 1502 performs calculations, factoring in the data from the position sensor 1504, the speed sensor 1506 and gear sensor 1510, to determine the driver's intention/need and engages the appropriate systems.

For example, if the gear sensor 1510 detects that the vehicle is in a non-reverse gear and the speed sensor 1506 detects the vehicle velocity to be below a speed threshold velocity of, for example 6 MPH, the controller 1502 will interpret a driver's forward leaning to be indicative of a situation in which an enhanced view of the forward of the vehicle is desired. Thus, the controller 1502 activates a forward camera 1514 and transmits images from the forward camera 1514 to a display 1512 situated so as to be viewable by the driver. However, if the speed sensor 1506 detects a vehicle velocity that exceeds the speed threshold, the controller 1502 will ignore the detected forward leaning of the driver.

While the above example refers to a speed threshold of 6 MPH, other appropriate values may be used instead as dictated both by practicality and local traffic laws relating to a driver interaction with a live video display. For example, a speed threshold of 10 MPH may be considered appropriate. Conversely, the speed threshold may need to be set to 0 MPH in certain municipalities. Therefore, the present disclosure contemplates a speed threshold having any value between, and including, 0 MPH and 10 MPH to be within the scope of the embodiments described herein.

Additionally, the present embodiment describes a forward camera 1514 which, for example, may be a single camera capable of providing a wide field of view, preferably at least 180°. If the forward camera 1514 is a single wide-view camera, the camera should preferably be angled at a 45° downward angle. Alternatively, the forward camera 1514 may be an assembly of several cameras, e.g., two cameras configured to provide an overlapping 180° view of an intersection, or even a greater than 180° view.

Figure 10:
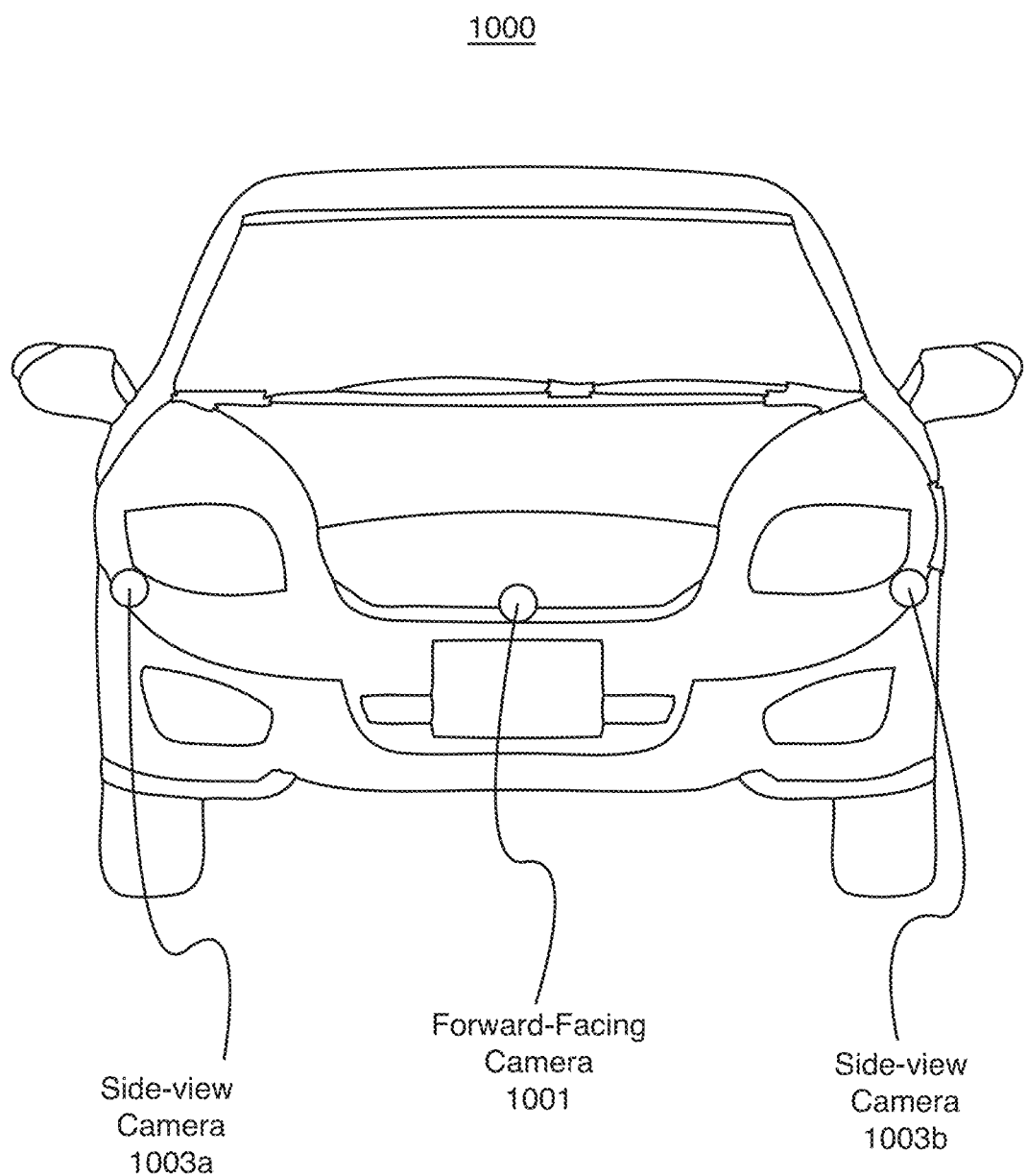
FIG. 10 illustrates a front view of a vehicle exterior, in accordance with an embodiment of the present disclosure.

Referring to FIG. 10, with a two-camera system, the cameras 1003*a* and 1003*b* may be positioned at opposite corners of the forward portion of the vehicle. Alternatively, a third camera 1001 may be positioned on the front of the vehicle 1000 centrally along the vehicle's long axis. The controller 1502 may include a signal-processing module (not shown) to edit and combine the video received from the forward camera 1514 to provide the driver with the best perception of the surroundings.

In an embodiment, the controller 1502 may be configured to select individual cameras of the forward camera 1514 in response to the driver's movements, such that visibility is increased on the left side, right side, or full 180° view.

Moreover, in an embodiment the controller 1502 communicates with a GPS system (not shown) so that when the driver is close to an intersection with a one-way street, the system activates only the camera showing the direction from which vehicles are expected to come.

The driver's motions are categorized in driving mode [D] (FIG. 3) in which a driver is seated with a normal posture; and the leaning forward mode [LFM] (FIG. 4) in which the vehicle's speed is low (under 6 mph) or the vehicle does not move at all, reverse gear is not engaged, and the driver exhibits a forward leaning posture to gain better visibility.

When the driver is in driving mode [D] his head is placed close to the seat's headrest and the FBSA system is in standby mode. When the vehicle velocity is low (e.g., under 6 mph), reverse gear is not selected and the driver leans forward, the system activates the FBSA system and:
1) The front camera or side-front camera is activated, and
2) The vehicle's monitor input is switched to show video from the camera.

The video provided by the front camera is a single plan showing left and right direction of the vehicle, covering at least 180 degrees, or a combination of two videos from two or more different video cameras (i.e., multi-camera configuration), one showing towards the left side of the vehicle and the other towards the right side of the vehicle. Thus, with respect to the present disclosure, it is understood that reference to a "front camera" refers to any configuration of one or more forward positioned cameras, and is not intended to limit any embodiment described herein to a singular front camera.

The multi-camera configuration is more effective in cases where the vehicle is approaching the intersection at an angle rather than perpendicular to the intersecting street. The multi-camera configuration eliminates the risk of a blind spot on the side that the vehicle and the intersecting street form the smaller entering corner.

Figure 3:
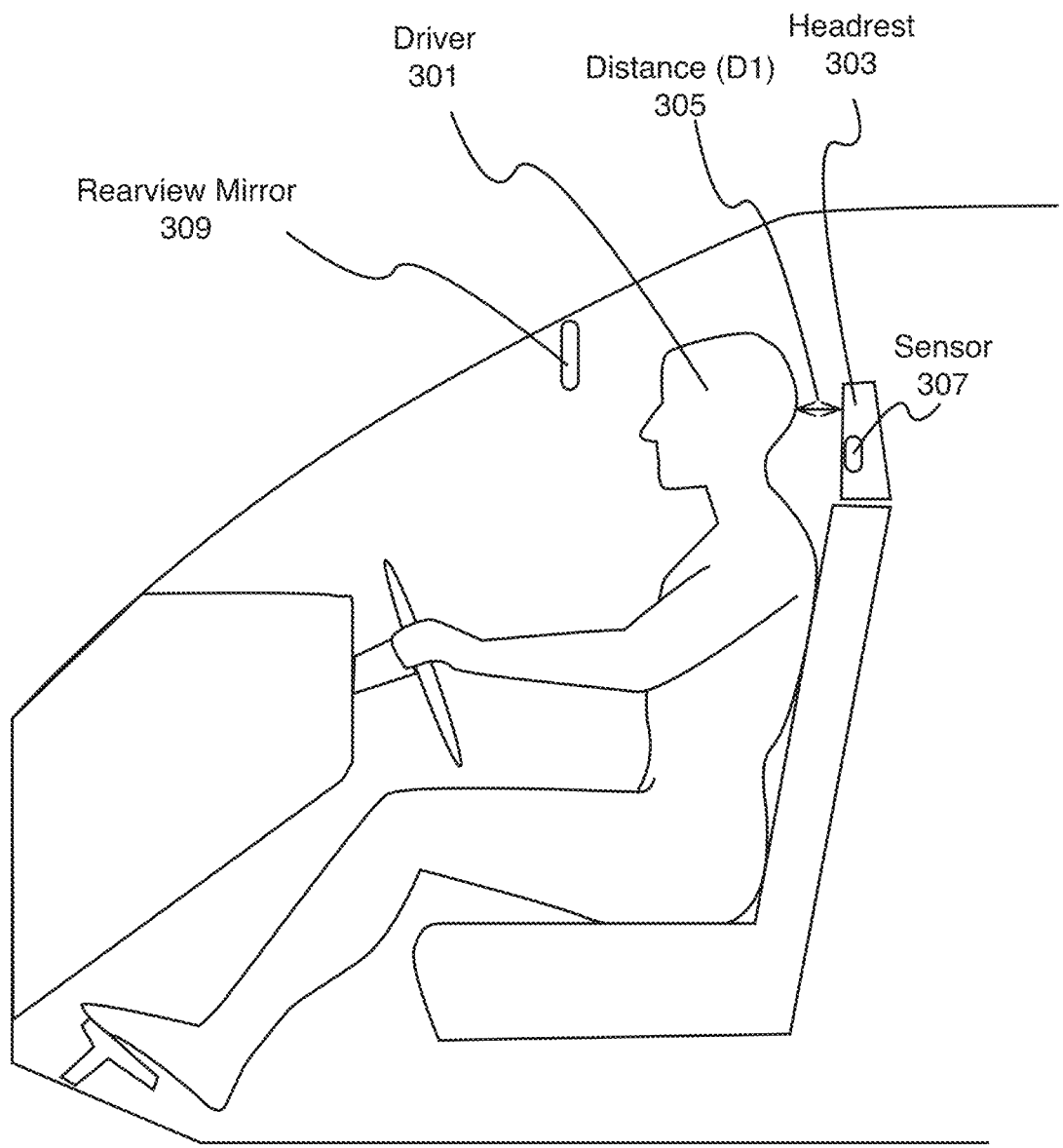
FIG. 3 illustrates a vehicle interior showing a driver positioned for driving, in accordance with an embodiment of the present disclosure.
Figure 4:
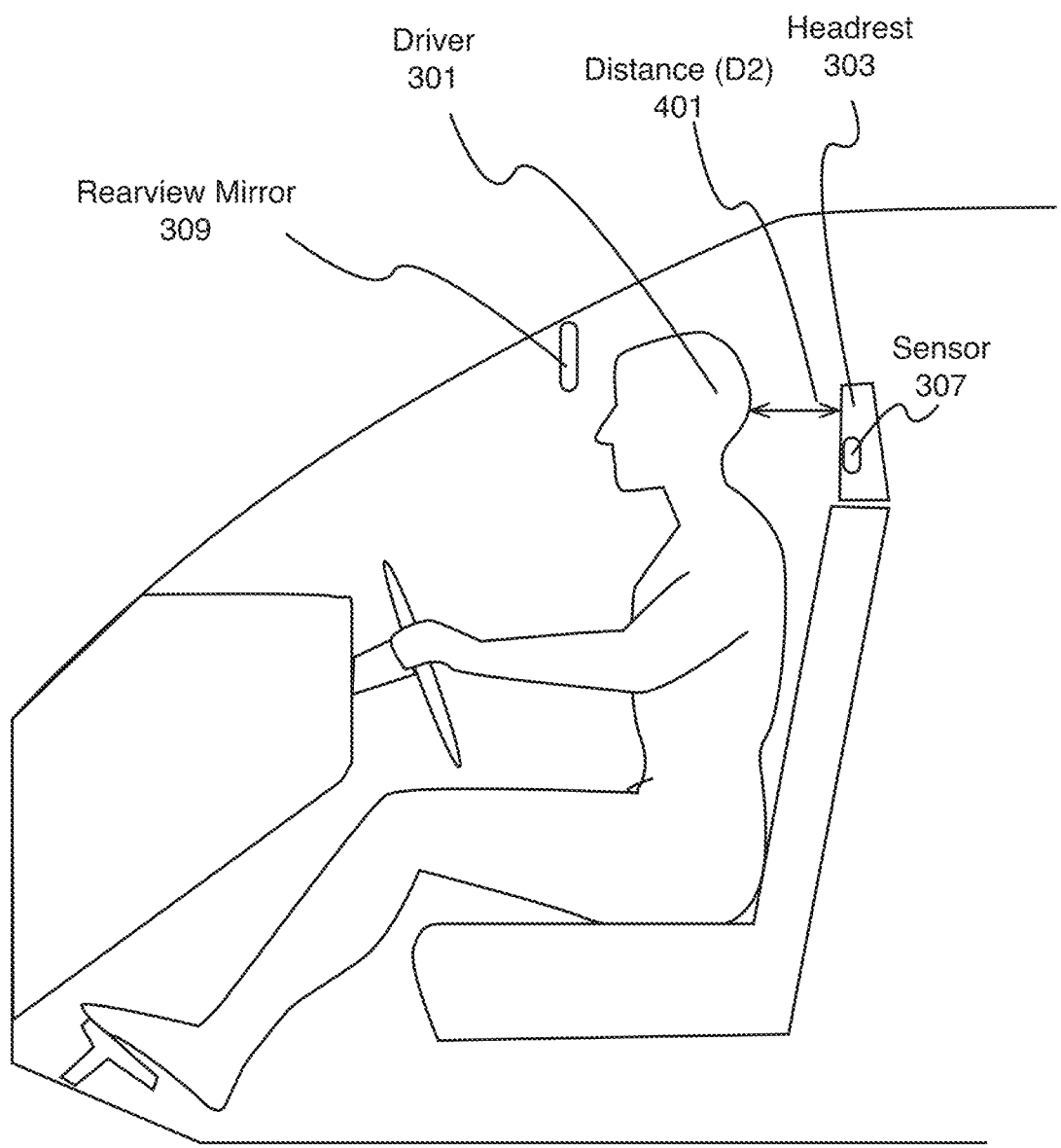
FIG. 4 illustrates a vehicle interior showing a driver in a lean-forward position, in accordance with an embodiment of the present disclosure.

Referring to FIGS. 3 and 4, when the driver 301 is approaching an intersection or exiting a parking spot and nearby obstacles are blocking the view, the driver will tend to move towards the steering wheel. This is a natural movement of the driver 301. The system uses this natural movement as a body gesture, which activates the controller to engage the camera and monitor. The result of the driver 301 leaning forward is that the distance between the head 301 and the headrest 401 is increased.

The position sensor 307, which can be placed on/under the headrest 303, or in another suitable position inside the vehicle's cabin, recognizes the movement of the driver 301 and activates the front camera which provide the driver with improved visibility of the intersection without the vehicle's grill significantly crossing the road line.

The position sensor 307 can be a proximity sensor, a camera or another suitable sensor as known in the art, which recognizes the alteration of the distance of the driver 301.

When the maneuver ends, the driver's head moves back to the deactivation threshold position and the FBSA is set to standby mode. The "home" screen of the vehicle's multimedia system is restored and the front camera is deactivated.

Rear View Parking Assistance (RVPA)

Another embodiment of the present disclosure is the Rear View Parking Assistance (RVPA) system that alters a driver's visible field, according to the driver's needs, when driving in reverse or driving in reverse gear for a parking maneuver.

The RVPA system may implement the rear cameras using several methods, such as:
(1) a two-camera system, one for the distant rear view and the other one for the closer rear obstacles;
(2) a camera with two signal outputs, one for the distant rear view and the other one for the closer rear obstacles; and
(3) a wide-angle view angle camera which provides a wide range picture, more than a monitor can show, with the controller selecting the appropriate framing and zooming for the optimum results.

When the car moves in reverse, the rear camera provides a wide view of the rear side of the car, giving the driver the ability to see remote obstacles. When the vehicle approaches the obstacle in a closer distance, the controller alters the view's framing and the driver may evaluate accurately the distance between the car's rear bumper and the obstacle(s).

The combination of altering the rear camera(s)' view angle and the zooming of the rear image assists the driver to perform a reverse maneuver safer and faster by providing him with an overall visibility.

Referring back to FIG. 15, the RVPA is a system which monitors the driver's position/motion to determine which visible field is more helpful for the driver. Depending on the driver's movements, the controller 1502 adjusts the tilting angle of the one or more side-view mirrors by controlling the side-view mirror adjustment motors 1520 in order to increase the driver's visibility on the side and behind of the vehicle.

The driver's motions are categorized in driving mode [D], which consists of the driving forward [DF] mode, the driving backwards [DB] mode, and the reverse & parking mode [RP].

When the driver is in driving mode [D] his head is placed close to the seat's headrest, as shown in FIG. 3, and the gear sensor 1510 detects that the vehicle is in a forward gear. In this situation, the RVPA system is placed in standby mode by the controller 1502. In the embodiment of FIG. 3, the driver's head is shown to be located at a distance D1 designated by reference numeral 305.

Figure 5:
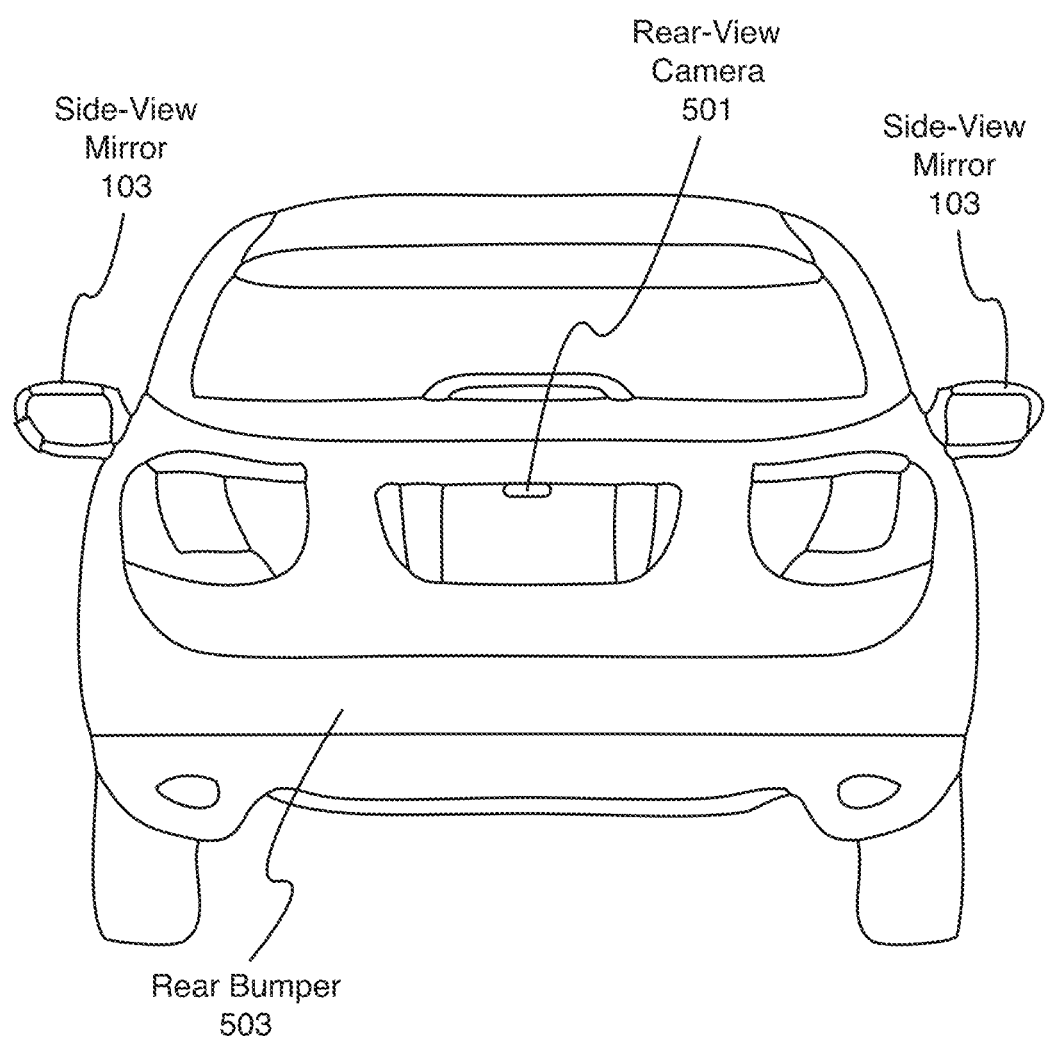
FIG. 5 illustrates a rear view of a vehicle exterior, in accordance with an embodiment of the present disclosure.
Figure 6:
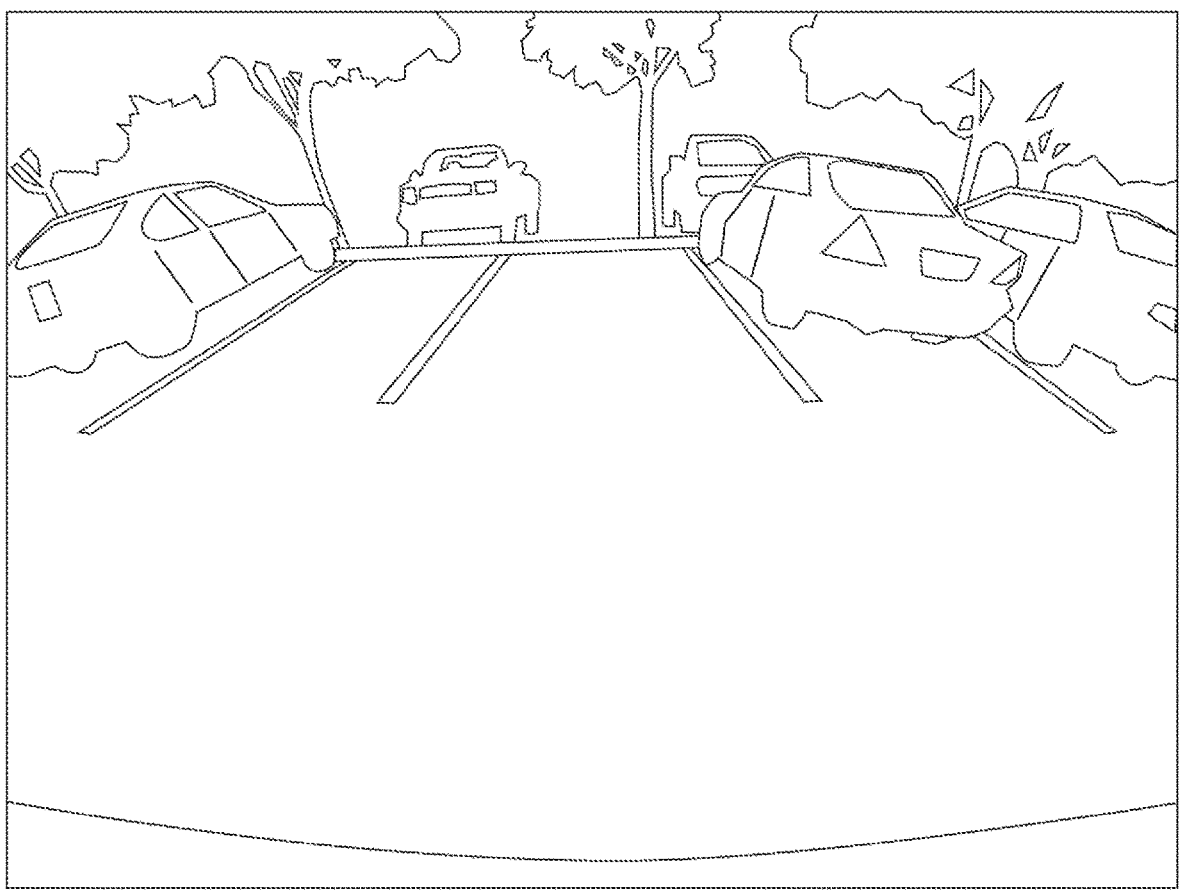
FIGS. 6-8 illustrate rear-view parking camera views, in accordance with an embodiment of the present disclosure.
Figure 7:
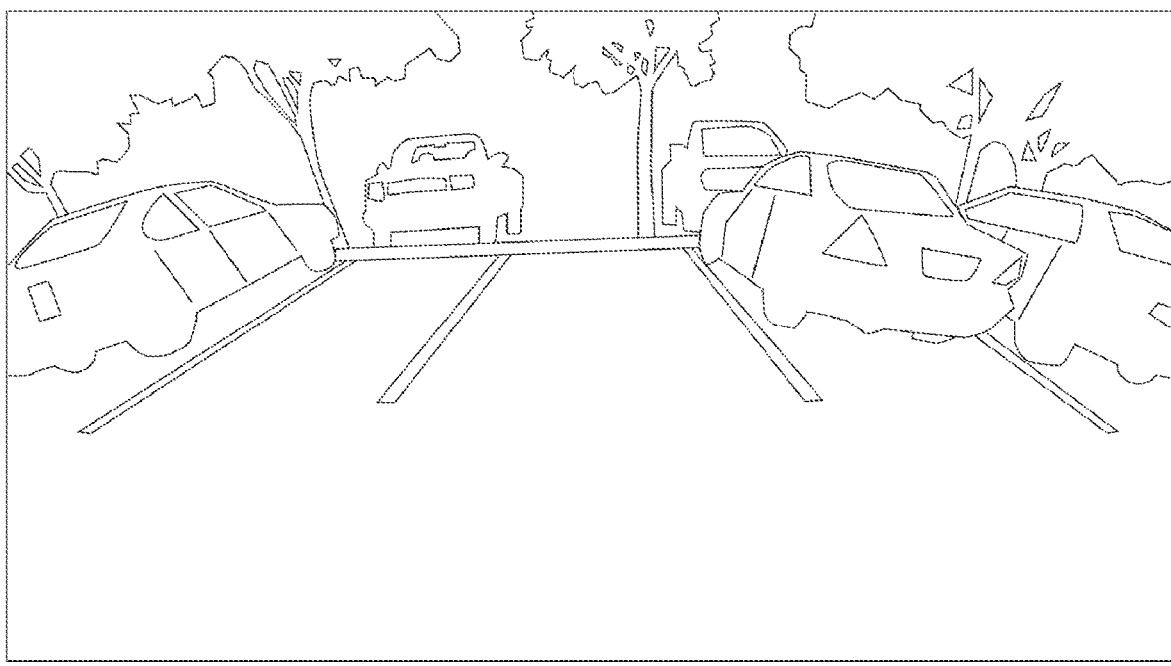

When the driver places the vehicle in a reverse gear, the gear sensor 1510 registers the change and provides the data to the controller 1502. The controller 1502 activates the rear camera (Normal-view) 1518 in order to increase the driver's visibility behind the vehicle. The rear camera (Normal-view) 1518 shows an image from the rear bumper 503 (See: FIG. 5) to the direction behind the vehicle as shown in FIGS. 6 and 7.

Figure 2:
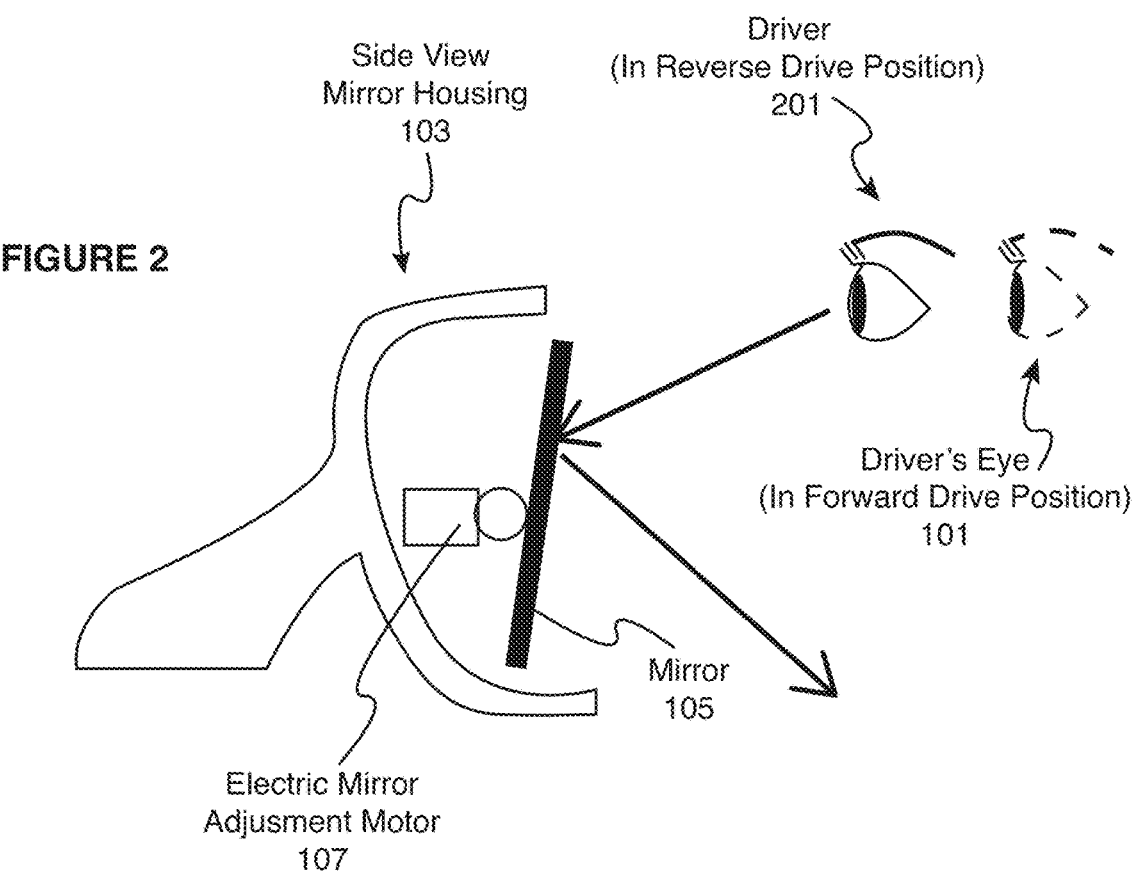
FIG. 2 illustrates a side-view mirror of a vehicle adjust for viewing obstacles during reverse driving/parking, in accordance with an embodiment of the present disclosure.
Figure 8:
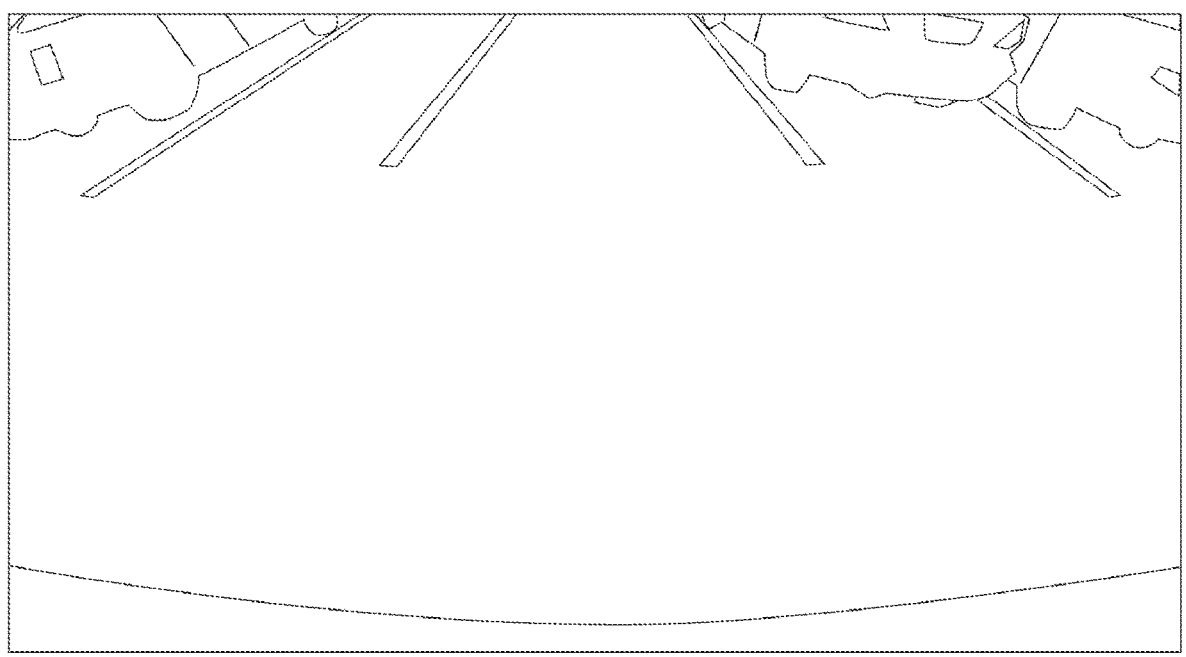

When the driver wishes to increase the side visibility of the vehicle, the driver leans forward (See: FIG. 4), moving his/her body closer to the steering wheel such that the driver's head is located at a distance D2, designated by reference numeral 401, which is greater than distance D1. Thus, the distance 401 between the driver's head and the headrest 303 is increased. The position sensor 307, placed on the headrest 303 or to other suitable place inside the vehicle's cabin, detects the movement of the driver 301, causing the controller 1502 to activate the side-view mirror adjustment motors 1520 to alter the tilt of the one or more side-view mirrors, as shown in FIG. 2. The altered tilt of the mirror changes the driver's view angle on the sides of the vehicle, thereby improving the visibility of the driver 301 in a reverse parking maneuver. Additionally, the controller 1502 switches video feed to the display 1512 from the rear camera (Normal-view) 1518 to the rear camera (Wide-view) 1516. The rear camera (Wide-view) 1516 provides a view of the rear of the vehicle closer to the bumper, such as shown in FIG. 8.

The position sensor 307 can be a proximity sensor, a camera or another sensor, which recognizes the alteration of the distance of the driver's head 301. More specifically, the sensor 307 is placed within the vehicle, e.g., inside the vehicle's cabin, and is configured to determine the driver's head position relative to a predetermined or designated point in the vehicle. In the embodiment shown in FIGS. 3 and 4, the designated point is a surface of the headrest 303 as described above. The position of the sensor 307 depends on the type of vehicle and/or the vehicle manufacturer.

When the reverse or the parking maneuver ends, the driver 301 deselects the reverse gear, the RVPA is set to standby mode, the side mirrors are restored in their original position and the rear camera 501 is deactivated.

The present embodiment describes a rear camera (Normal-view) 1518 and a rear camera (Wide-view) 1516 as separate cameras. However, a single camera can provide both the wide-view and the narrow-view functionalities, either by electronically controlled optics or via software-based image processing to crop a wide-view image such that only the normal-view is provided when appropriate. The zooming between the wide-view image and the normal-view image can be proportional to the degree of forward movement of the driver beyond the activation threshold.

In an embodiment, the controller 1502 provides a wide view and a narrow view to the display 1512 simultaneously, such that the video from both the rear camera (Wide-view) 1516 and the rear camera (Normal-view) 1518 are displayed in a split-screen view on the display 1512.

Figure 1:
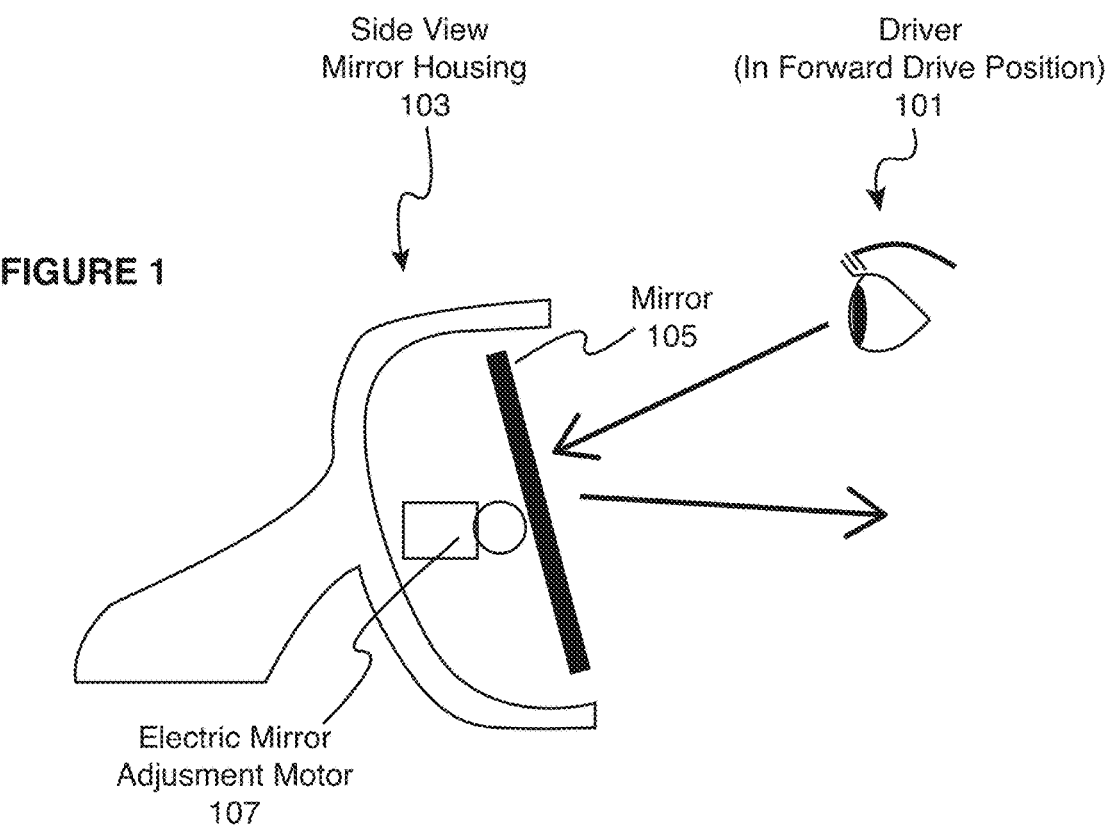
FIG. 1 illustrates a side-view mirror of a vehicle adjusted for driving, in accordance with an embodiment of the present disclosure.

Referring to FIGS. 1 and 2, the vehicle's mirror tilting mechanism 107 can be adjusted in two different positions, the driving mode [D], shown in FIG. 1, or the reverse and parking mode [RP], shown in FIG. 2. Alternatively, mirror tilting can be proportional to the driver's head distance from the headrest 303.

In FIG. 1, the view angle of the driver 101 is illustrated when he/she is driving forward or backwards. The mirror tilting mechanism 107 has been set to the default settings that the driver 101 has arranged for everyday use.

In FIG. 2, the difference in the driver's view angle is depicted when the driver changes from the driving position [D] to the reverse parking position [RP] which means that driver has pulled closer to the steering wheel in order to see the obstacles which are not visible when in the driving mode [D].

The display disclosed in the embodiments above may be the display utilized for vehicle navigation, a display dedicated to providing the vehicle collision avoidance system, or any other appropriately configured video display device. In an embodiment, the display may be incorporated into the rearview mirror 309, shown in FIG. 3. The display may utilize any suitable display technology known to one of ordinary skill in the art, for example OLED, LED, and ePaper, as appropriate.

Combined FBSA & RVPA

Figure 12:
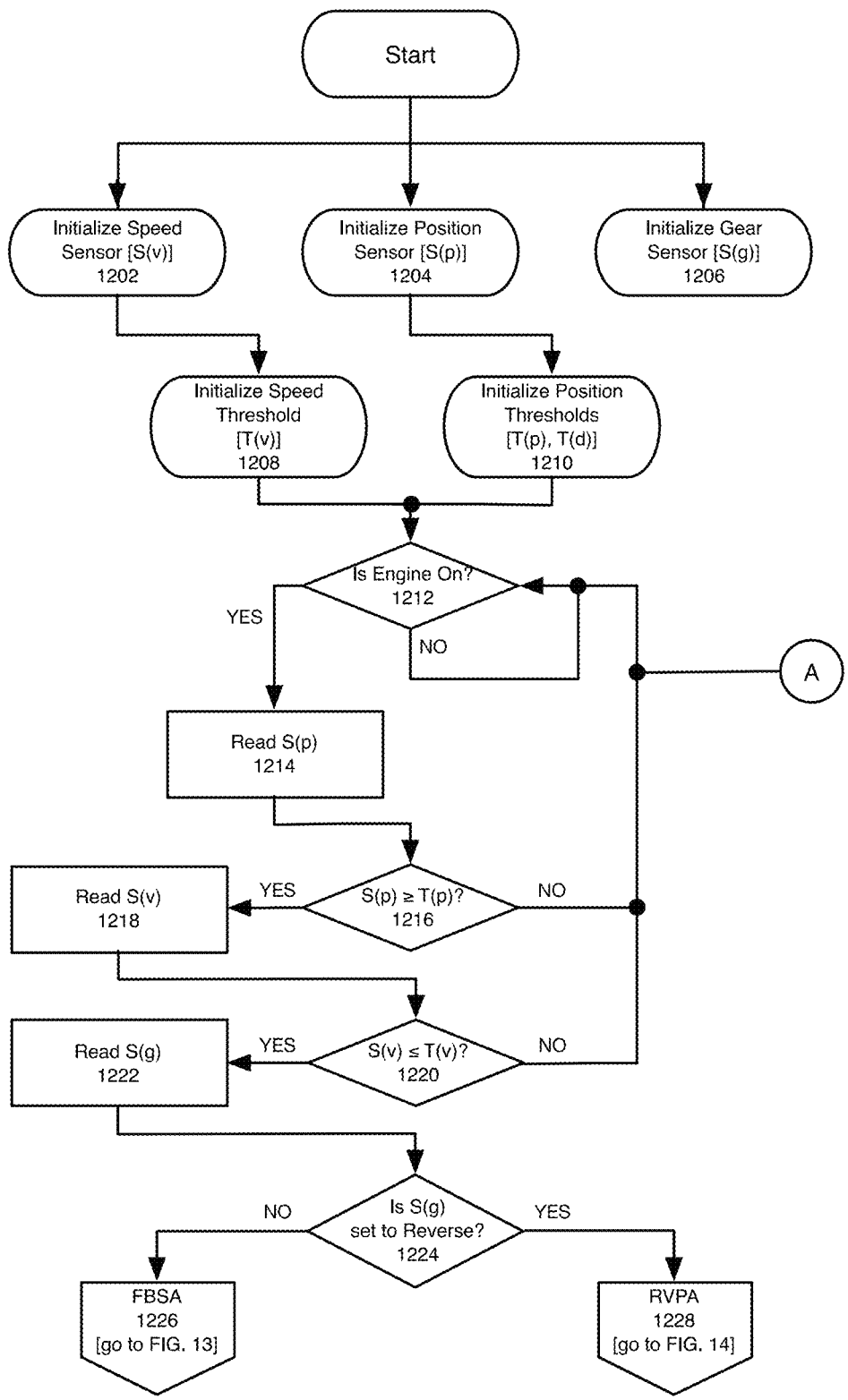
FIGS. 12-14 illustrate a process in accordance with an embodiment of the present disclosure.

Referring to FIG. 12, an embodiment of the present disclosure performs the process illustrated therein. In the present embodiment, a process for providing vehicle collision avoidance begins once a driver turns the ignition key to the accessory position, with initialization of a vehicle speed sensor ($S_{(v)}$) at step 1202. In addition, a position sensor ($S_{(p)}$) is initialized in step 1204. The position sensor ($S_{(p)}$) is configured to determine the position of the driver's head with respect to a predefined point on the driver's seat. As described above, in an embodiment of the present disclosure, the predefined point is located on the driver's headrest. Further, a gear sensor ($S_{(g)}$ is initialized at step 1206. The gear sensor ($S_{(g)}$) determines the gear that the vehicle is in. Specifically, the gear sensor ($S_{(g)}$) determines whether the vehicle is in a reverse gear or a non-reverse gear (i.e., neutral or a forward gear).

The process proceeds to step 1208 where the process initializes a speed threshold ($T_{(v)}$) above which the process will discontinue displaying camera video to the driver. The purpose of the speed threshold ($T_{(v)}$) is to avoid distracting the driver during normal driving. Moreover, many states in the United States of America prohibit displaying video feeds to a driver during normal driving as this is a significant distraction that can lead to collisions. Thus, the speed threshold ($T_{(v)}$) is set to a value indicative of situations involving parking, pulling out of a parking space, cautiously entering an intersection or other similar scenarios. For example, in one embodiment the speed threshold ($T_{(v)}$) may be set to any value below 10 miles per hour, and in another embodiment the speed threshold ($T_{(v)}$) may be set to 5 miles per hour.

Figure 13:
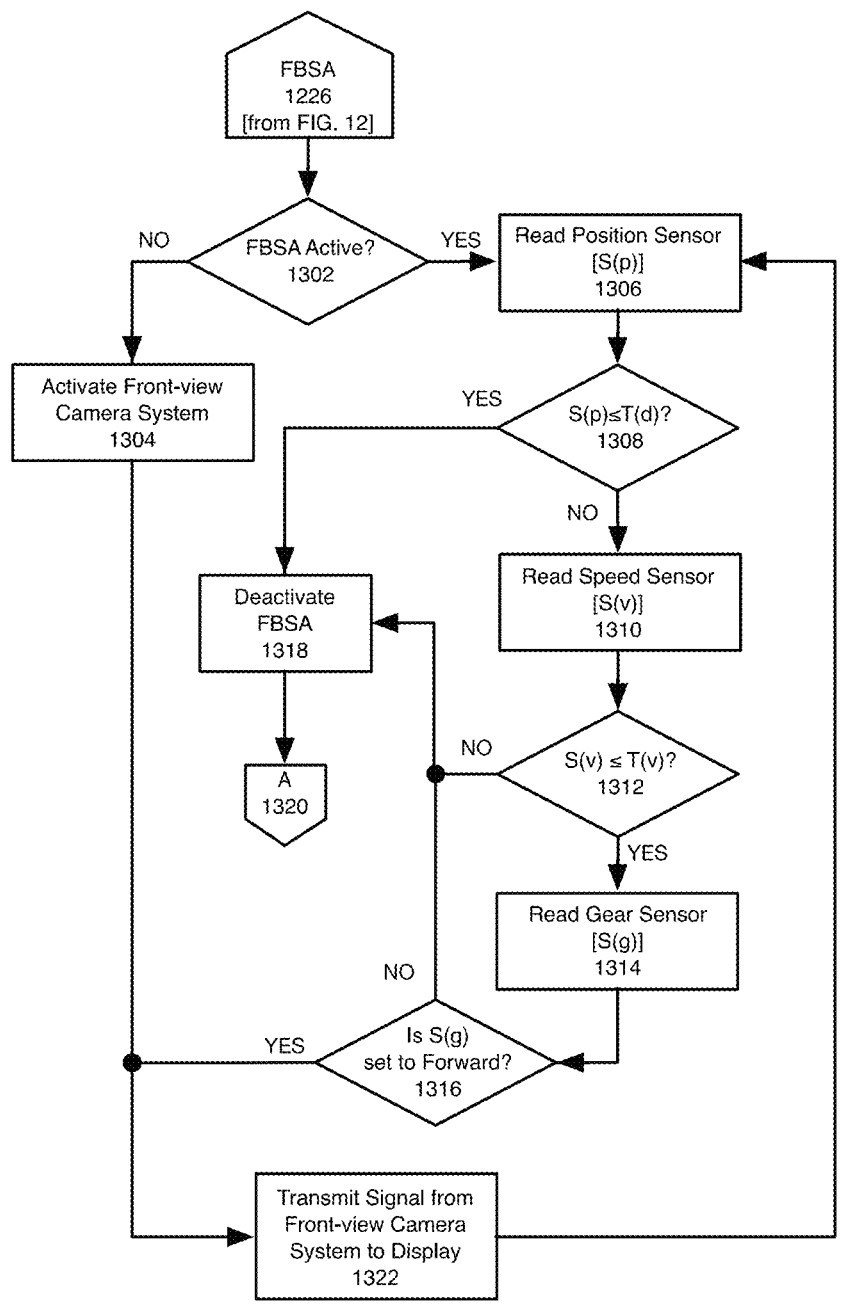
Figure 14:
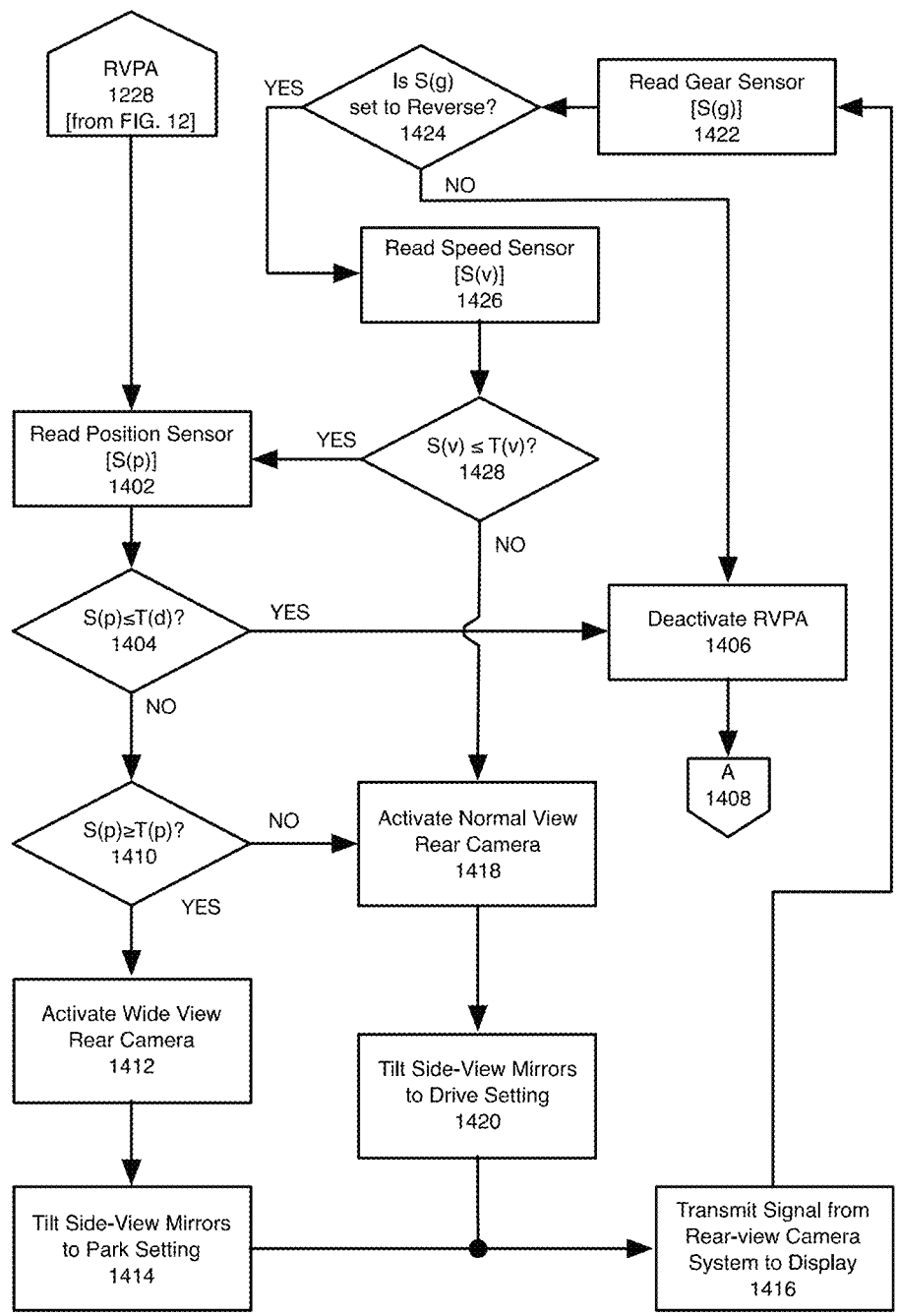

The process then proceeds to initialize position thresholds ($T_{(p)}$, $T_{(d)}$) in step 1210. The position activation threshold ($T_{(p)}$) defines the minimum distance between the driver's head and the predefined point on the driver's seat at which the process will activate either the Forward Blind Spot Assistance system (See: FIG. 13) or the Rear View Parking Assistance System (See: FIG. 14). The position deactivation threshold ($T_{(d)}$), on the other hand, defines a maximum distance from the predefined point on the driver's seat at which the process will deactivate the Forward Blind Spot Assistance system or the Rear View Parking Assistance System. Thus, the position deactivation threshold ($T_{(d)}$) has a value less than the position activation threshold ($T_{(p)}$).

Consequently, when a driver leans forward such that the driver's head surpasses the position activation threshold ($T_{(p)}$), the collision avoidance system activates in accordance with the present disclosure and remains active until the driver resumes a normal driving position once again as determined by the driver's head being closer to the predefined point on the driver's seat than position deactivation threshold ($T_{(d)}$).

Upon completing the initialization steps 1202 through 1210, the process checks whether the vehicle engine is on in step 1212. If the engine is not on, the process enters a loop that either continuously or intermittently performs the check in step 1212. However, if the engine is on, the process proceeds to step 1214 where the position sensor ($S_{(p)}$) is read. In step 1216, the value read from the position sensor ($S_{(p)}$) is compared to the position activation threshold ($T_{(p)}$). If the value read from the position sensor ($S_{(p)}$) is less than the position activation threshold ($T_{(p)}$), the process enters a loop returning back to step 1212.

Alternatively, if the value read from the position sensor ($S_{(p)}$) is greater than or equal to the position activation threshold ($T_{(p)}$), the processes continues to step 1218. At step 1218 the process reads the value from the speed sensor ($S_{(v)}$). In step 1220 the value read from the speed sensor ($S_{(v)}$) is compared to the speed threshold ($T_{(v)}$). If the value read from the speed sensor ($S_{(v)}$) is greater than the speed threshold ($T_{(v)}$), the process enters a loop returning back to step 1212.

However, if in step 1220, the value read from the speed sensor ($S_{(v)}$) is less than or equal to the speed threshold ($T_{(v)}$), the process continues to step 1222. At step 1222, the gear position is read from the gear sensor ($S_{(g)}$), which is used to determine if the vehicle is in a forward gear or a reverse gear at step 1224. If the vehicle is in reverse gear, the process proceeds to step 1228 to activate the Rear View Parking Assistance System, which is further described below in reference to FIG. 14. However, if the vehicle is not in reverse gear, the process proceeds to step 1226 to activate the Forward Blind Spot Assistance system, which is further described below in reference to FIG. 13.

As apparent to one of ordinary skill in the art, the various sensors and activations may be arranged in alternative configurations as appropriate for a particular implementation. For example, the reverse gear check (step 1224) may be provided prior to the engine check (step 1212) such that the system immediately activates the reverse view camera upon placing the vehicle in reverse gear regardless of the status of the engine. Moreover, two reverse gear checks may be provided one at a position prior to the engine check (e.g., between steps 1210 and 1212) and one at the position shown in FIG. 12.

Further, the reverse gear check, as well as any or all of the other sensors checks, may operate in parallel, i.e., simultaneously and continuously, such that the present invention reacts to changes received from the sensors as they occur rather than being limited to a sequential process flow as shown in FIG. 12 through 14. The above modifications, as well as any other modification as known to one of ordinary skill in the art, are not considered as departing from the present disclosure.

Referring to FIG. 13, in the case where the process described above with reference to FIG. 12 determines that the vehicle is not in reverse gear in step 1224, the process continues to step 1226 where the Forward Blind Spot Assistance system is activated. Activation of the Forward Blind Spot Assistance system includes the step 1302 where the process determines if the Forward Blind Spot Assistance system is already active. If the Forward Blind Spot Assistance system is not already active, then the front-view camera system is activated in step 1304 and the video signals therefrom are transmitted to a display viewable by the driver in step 1322.

However, if the Forward Blind Spot Assistance system is already active in step 1302, the process reads the value from the position sensor ($S_{(p)}$) in step 1306. In step 1308 the value from the position sensor ($S_{(p)}$) is compared to the position deactivation threshold ($T_{(d)}$). If the value of the position sensor ($S_{(p)}$) is less than or equal to the position deactivation threshold ($T_{(d)}$), the process proceeds to step 1318 where the Forward Blind Spot Assistance system is deactivated. Deactivation of the Forward Blind Spot Assistance system includes deactivating the front-view camera as well as any other supporting systems. Once the Forward Blind Spot Assistance system is deactivated the process continues to step 1320, which loops back to step 1212 in FIG. 12.

However, if the value from the position sensor ($S_{(p)}$) is greater than or exceeds the position deactivation threshold ($T_{(d)}$) in step 1308, the process continues to step 1310 where the value of the speed sensor ($S_{(v)}$) is read. The process then compares the value of the speed sensor ($S_{(v)}$) to the speed threshold ($T_{(v)}$) in step 1312. If the value of the speed sensor ($S_{(v)}$) exceeds the speed threshold ($T_{(v)}$), the process proceeds to step 1318 where the Forward Blind Spot Assistance system is deactivated. Once the Forward Blind Spot Assistance system is deactivated the process continues to step 1320, which loops back to step 1212 in FIG. 12.

However, if the value from the speed sensor ($S_{(v)}$) is less than or equal to the speed threshold ($T_{(v)}$) in step 1312, the process continues to step 1314 where the value of the gear sensor ($S_{(g)}$) is read. The process then determines if the gear sensor ($S_{(g)}$) indicates that the vehicle is in a forward gear, or in neutral, in step 1316. If the vehicle is determined to be in a reverse gear (i.e., not in either neutral or a forward gear), the process proceeds to step 1318 where the Forward Blind Spot Assistance system is deactivated. Once the Forward Blind Spot Assistance system is deactivated the process continues to step 1320, which loops back to step 1212 in FIG. 12.

If the vehicle is determined to be in a non-reverse gear (i.e., either neutral or a forward gear), the process proceeds to step 1322 where the video signals from the front view camera system continue to be transmitted to a display viewable by the driver, and the process continues as described above.

Referring to FIG. 14, in the case where the process described above with reference to FIG. 12 determines that the vehicle is in reverse gear in step 1224, the process continues to step 1228 where the Rear View Parking Assistance system is activated. Activation of the Rear View Parking Assistance system includes the step 1402 where the process reads the position sensor ($S_{(p)}$).

After reading the position sensor ($S_{(p)}$) in step 1402, the process compares the value of the position sensor ($S_{(p)}$) against the position deactivation threshold ($T_{(d)}$) in step 1404. If the position sensor ($S_{(p)}$) is less than or equal to the position deactivation threshold ($T_{(d)}$) in step 1404, the process proceeds to step 1406 where the Rear View Parking Assistance system is deactivated and the process continues to step 1408 returning to step 1212 in FIG. 12. When the Rear View Parking Assistance system is deactivated, the side view mirrors are readjusted back to a normal driving configuration and the wide view and the normal view rear cameras are deactivated as well.

Alternatively, if the position sensor ($S_{(p)}$) is greater than the position deactivation threshold ($T_{(d)}$) in step 1404, the process proceeds to step 1410. At step 1410, the value of the position sensor ($S_{(p)}$) is compared against the position activation threshold ($T_{(p)}$). If the position sensor ($S_{(p)}$) is greater than or equal to the position activation threshold ($T_{(p)}$) then the process continues to step 1412. At step 1412 the process activates the wide view rear camera. The wide view rear camera allows the driver to visualize the area of the vehicle near the rear bumper. Next, the process controls the electric mirror adjustment motor 107 (see: FIG. 2), situated in a side-view mirror housing 103, to adjust the side-view mirror 105 to a park setting in step 1414. In the park setting, the side-view mirror is aimed such that the driver 201 has a clear view of the ground at the rear side of the vehicle. The present embodiment may include one or more side-view mirrors. The process then proceeds to step 1416 where the rear-view camera system transmits video signals to a display viewable by the driver.

Additionally, the process reads the state of the gear sensor ($S_{(g)}$) in step 1422. Based on the state of the gear sensor ($S_{(g)}$) the process determines if the vehicle is still in reverse gear in step 1424. If the vehicle is no longer in reverse gear the process proceeds to step 1406 and deactivates the Rear View Parking Assistance system. When the Rear View Parking Assistance system is deactivated, the side view mirrors are readjusted back to a normal driving configuration and the wide view and normal view rear cameras are deactivated as well. The process then continues to step 1408, which loops the process back to step 1212 in FIG. 12. Alternatively, if the vehicle remains in reverse gear as determined in step 1424, the process continues onto step 1402 and proceeds as described above.

If the position sensor ($S_{(p)}$) is less than the position activation threshold ($T_{(p)}$) then the process continues to step 1418. At step 1418 the process activates the normal view rear camera. The normal view rear camera allows the driver to visualize obstacles in a wide area behind the vehicle that could cause a collision while the vehicle is backing up. Next, the process controls the electric mirror adjustment motor 107 (see: FIG. 1), situated in a side-view mirror housing 103, to adjust the side-view mirror 105 to a default drive setting in step 1420. In the default drive setting the side-view mirror 105 provides the driver 101 with a clear view along the side of the vehicle. The process proceeds to step 1416 where the rear-view camera system transmits video signals to the display viewable by the driver.

Additionally, the process reads the state of the gear sensor ($S_{(g)}$) in step 1422. Based on the state of the gear sensor ($S_{(g)}$) the process determines if the vehicle is still in reverse gear in step 1424. If the vehicle is no longer in reverse gear the process proceeds to step 1406 and deactivates the Rear View Parking Assistance system. When the Rear View Parking Assistance system is deactivated, the side view mirrors are readjusted back to a normal driving configuration and the wide view and the normal view rear cameras are deactivated as well. The process then continues to step 1408, which loops the process back to step 1212 in FIG. 12. Alternatively, if the vehicle remains in reverse gear as determined in step 1424, the process continues onto step 1426.

At step 1426, the process reads the state of the speed sensor ($S_{(v)}$). Based on the state of the speed sensor ($S_{(v)}$) the process determines if the vehicle is still below the speed threshold ($T_{(v)}$) in step 1428. If the vehicle is no longer below the speed threshold ($T_{(v)}$), the process proceeds to step 1418. If the vehicle speed is over the speed threshold ($T_{(v)}$), the system switches to normal view rear camera. Alternatively, if the vehicle remains below the speed threshold ($T_{(v)}$) as determined in step 1428, the process continues onto step 1402 and proceeds as described above.

The Rear View Parking Assistance system continues operating until the vehicle is shifted out of reverse gear as determined in step 1424 or the position sensor ($S_{(p)}$) returns a value less than or equal to the position deactivation threshold ($T_{(d)}$) in step 1404.

Figure 16:
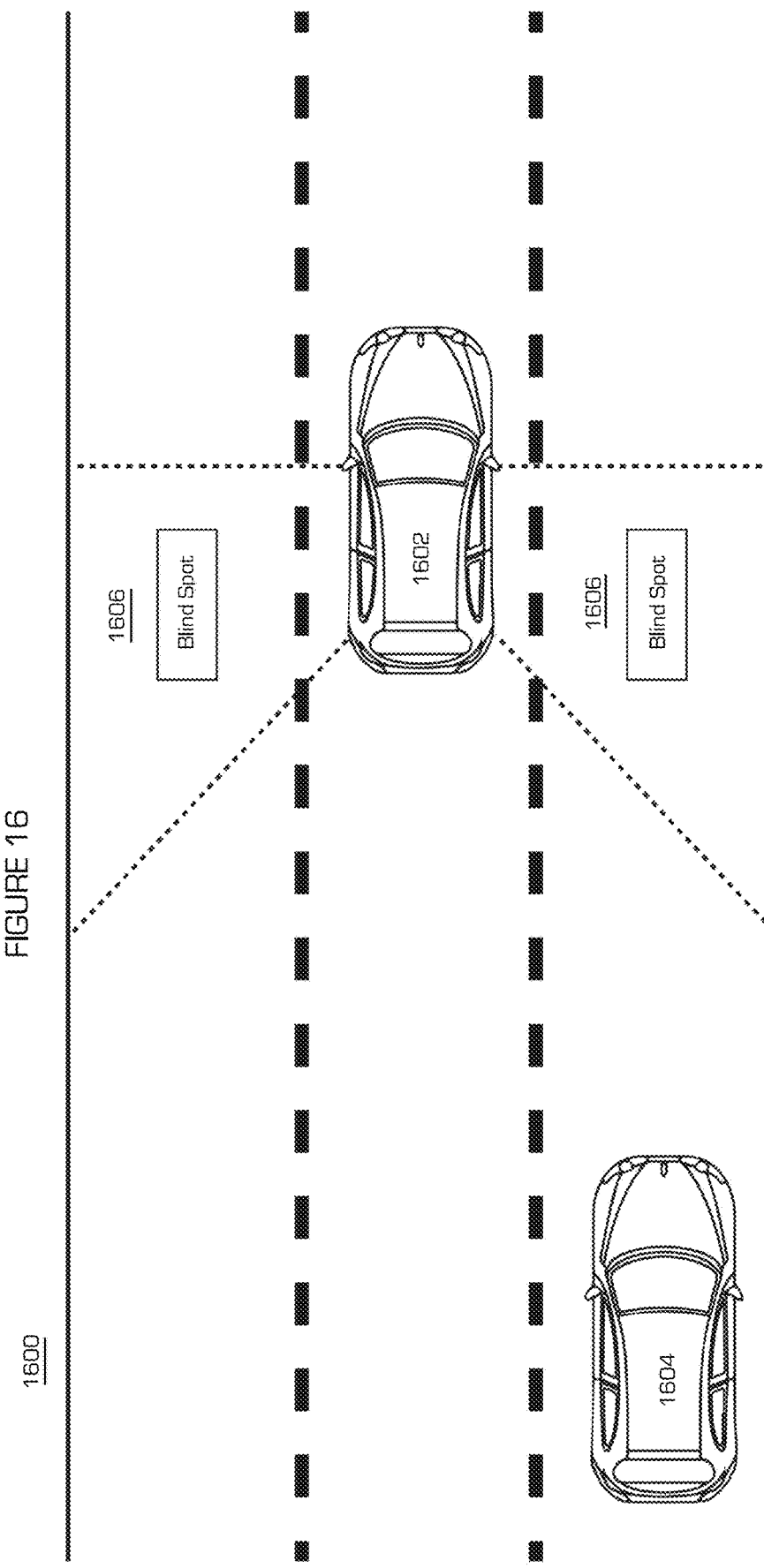
FIG. 16 illustrates an elevated view of vehicles on a road, in accordance with an embodiment of the present disclosure.

With reference to FIG. 16, an embodiment of the present disclosure can be implemented to address blind spots 1606 present in a driver's side view as shown in FIG. 16. On a roadway 1600 multiple vehicles (e.g., lead vehicle 1602 and rear vehicle 1604) may be present in close proximity to one another. A driver may adjust the size of the blind spot 1606 within a certain range by adjusting the angle of the side view mirrors. However, trade-offs exist when attempting to minimize a blind spot 1606. If the driver angles the side view mirror to an extent that the blind spot 1606 is minimized in close adjacent proximity to the vehicle 1602, the driver will also increase the blind spot 1606 in regions further from the vehicle 1602. In an alternative case, a driver adjusting the side view mirror to minimize blind spots 1606 further from the vehicle 1606 (for example, in adjacent lanes) will cause an increased blind spot closer to the vehicle 1602. Consequently, regardless of the adjustments to the angle of the side view mirrors, situations can arise where the resulting blind spot 1606 can result in a dangerous lane change or other vehicle maneuvers.

Figure 17:
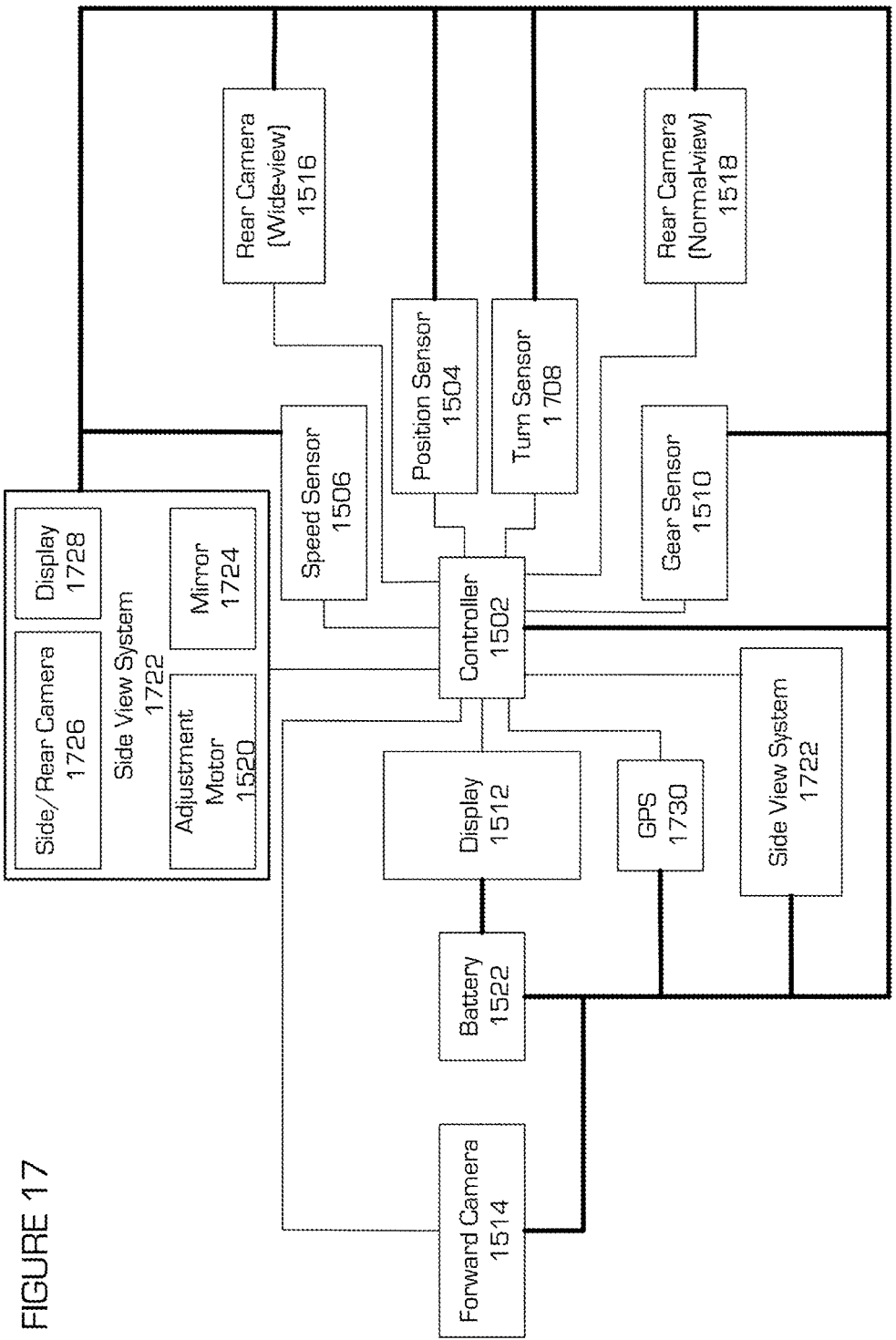
FIG. 17 illustrates a block representation of an embodiment of the present disclosure.

Accordingly, some embodiments can include Lane Change Blind Spot Assistance (LCBSA). The components of the LCBSA are shown in FIG. 17, while an embodiment of the operational process is described with reference to FIGS. 18 and 19. The LCBSA system allows drivers to safely change lane for the purpose of exiting a highway or to overtake another slow-moving vehicle. Additionally, the LCBSA can also be configured to adjust the side view during parallel parking and when entering traffic from a parallel parked position.

Figure 20:
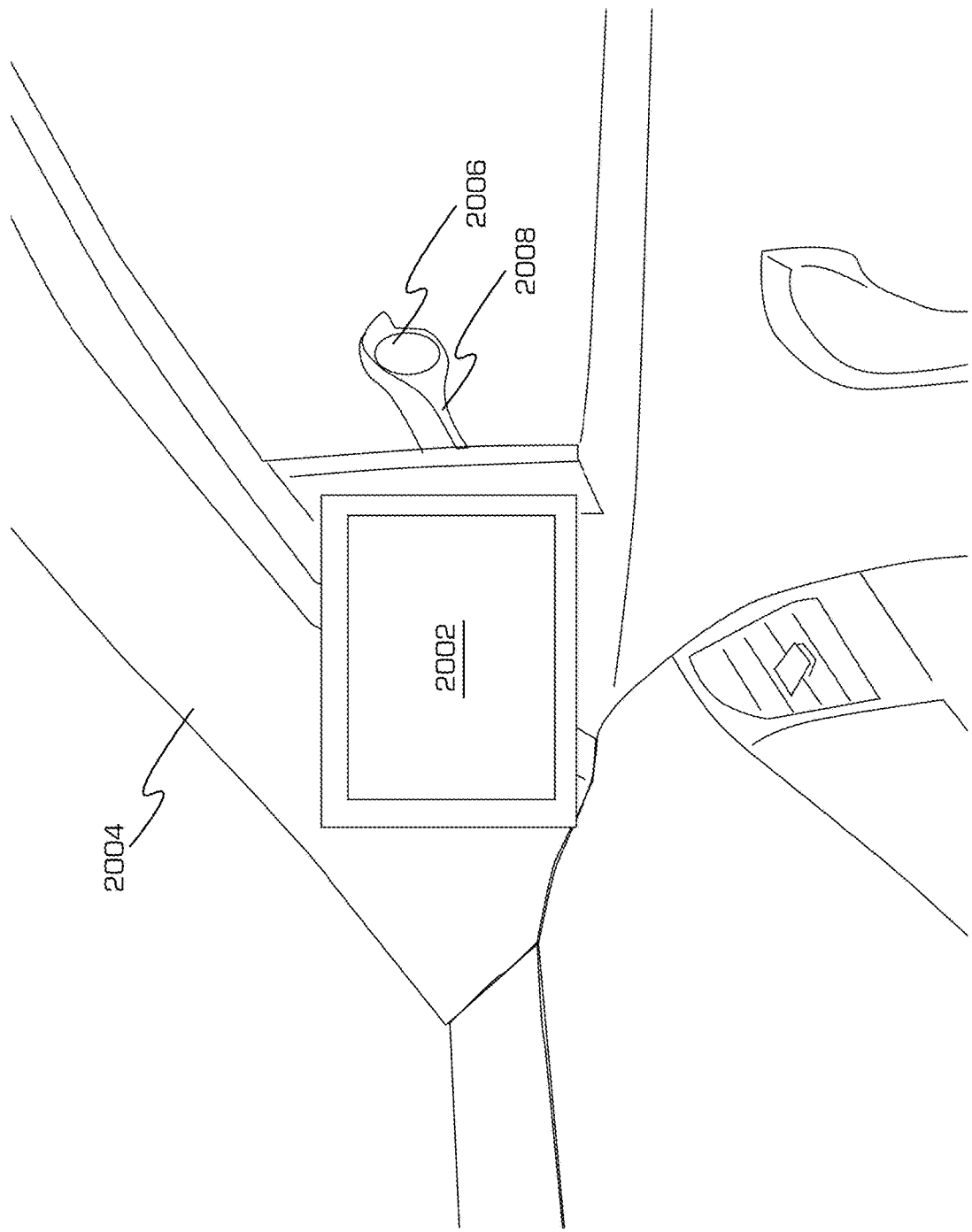
FIG. 20 illustrates placement of a side-view camera and display in a vehicle, in accordance with an embodiment of the present invention.

In embodiments of the present disclosure, by tilting the side-view mirror outwards the driver will have an expansive field of view, allowing the driver to see oncoming traffic and change lane with safety. Consequently, the driver is at a significantly reduced risk of collision with oncoming traffic. Furthermore, the side view mirror can be a camera with an expanded field of view providing the same functionality. In embodiments where a camera provides a side view, a video feed is transmitted from the side view camera to a display screen that can be positioned on a dashboard of the vehicle. Alternative embodiments can have the display screen mounted on an internal vehicle surface, such as, for example, on a door pillar, on a door, top surface of a dashboard, or other suitable location inside the car. FIG. 20 shows an embodiment in which the display screen 2002 is mounted on a region of a door pillar 2004 approximately in line with an area where a standard side view mirror would be located. Additionally, FIG. 20 shows a placement of a side view camera 2006 external to the vehicle. In some embodiments, the side view camera 2006 can be arranged at distal end of a stalk 2008.

Drivers will turn their heads towards the direction of the lane change prior to initiating a lane change in order to evaluate the safeness of the maneuver. Additionally, drivers will activate a turn signal to indicate the intention to switch lanes to other drivers prior to committing to perform a lane change. Moreover, drivers instinctually lean forward slightly when changing lanes in order to compensate for blind spots in side-view mirrors. One or more of these deliberate driver actions, in some embodiments can be, monitored and used to control the field of view of the side view allowing for safer lane changes. The direction in which the driver turns his/her head can be used to determine which side view mirror/camera is to be adjusted as well.

In some embodiments, a global positioning system (GPS) unit and digital navigation maps can be used to further anticipate when a driver may intend to make a lane change. For example, in an effort to have the side view in a configuration desired by the driver, some embodiments can reference the digital map region corresponding to the vehicle position as reported by the GPS unit and, especially if the driver has entered a route or destination, anticipate whether the driver will need to change lanes in order to, for example, take an exit ramp, or avoid road hazards (e.g., construction, accidents). Some embodiments, upon determining that a lane change is likely soon based on the digital map and GPS, can change the field of view of the side-view to an appropriate lane change view (e.g., wider field of view) in anticipation of the lane change intention by the driver. Other embodiments, upon determining that a lane change is likely soon based on the digital map and GPS, can change the field of view of the side-view to an intermediate field of view so that when the driver does provide one or more of the deliberate driver actions, the system is able to more present the driver with the appropriate field of view with less delay.

Turning to FIG. 17, the block representation shown includes components shown in FIG. 15 as well. Thus, components shared between the embodiments represented by FIG. 15 and FIG. 17 are referenced by like numerals. Moreover, for brevity and simplification describing the present embodiment reflected in FIG. 17, the components previously described with respect to FIG. 1 through FIG. 15 will not be described except as necessary to fully describe operation of the present embodiment. Additionally, the forward camera 1514, the rear camera (wide-view) 1516 and the rear camera (normal view) 1518 are not required for the proper operation of the LCBSA system. Consequently, the forward camera 1514, the rear camera (wide-view) 1516 and the rear camera (normal view) 1518, in some embodiments, can be omitted where the system provides a stand-alone LCBSA. Alternatively, embodiments of the LCBSA system can be integrated with the FBSA system and RVPA system described with respect to FIG. 12 through FIG. 14.

Embodiments, as shown in FIG. 17, can include a controller 1502 configured to control the various sensors, cameras, motors and display as well as execute a vehicle collision avoidance method, as described herein below with reference to FIGS. 18 and 19. Additionally, the system shown in FIG. 17 includes at least one position sensor 1504, at least one speed sensor 1506, at least one gear sensor 1510, and at least one turn signal sensor 1708 coupled to the controller 1502. The controller 1502 is also coupled to a display 1512 that is configured to switchably display video imaged by any of cameras attached to the system, such as, for example, a forward camera 1514, a rear camera (Wide-view) 1516 and a rear camera (Normal-view) 1518. In some embodiments, the side-view system 1722 may include a camera 1724 having a video feed displayed on a second display 1728 positioned, for example, on a door pillar in line with a side view, as shown in FIG. 20.

Additionally, the controller 1502 is coupled to side-view mirror adjustment motors 1520. In some embodiments, the side-view mirror adjustment motors 1520 can be servo motors. In other embodiments, the side-view mirror adjustment motors 1520 can be stepper motors. Further, the system shown in FIG. 17 is equipped with a battery 1522 configured to provide energizing power to the various components described above.

Moreover, the system shown in FIG. 17 may include one or more accessory ports (not shown) coupled to the controller 1502. The accessory port protocol may be selected, for example, from USB, serial, IEEE 1394 (i.e., Firewire), IEEE 802.3af (i.e., Power over Ethernet), IEEE 802.11-2016 (i.e., Wi-Fi), Bluetooth, Thunderbolt, or a combination of these interfaces. In some embodiments, the protocol implementing the accessory ports can be a proprietary protocol. The one or more accessory ports are coupled to the controller 1502 such that the controller 1502 can control accessory devices connected by way of the accessory port based on the driver's movements.

In the embodiment shown in FIG. 17, the position sensor 1504 may include a calibration feature that may be hardware implemented, such as with potentiometers, or software implement, such that the controller provides the driver with a calibration interface on the display 1512. The calibration feature allows the driver to fine tune the position sensor 1504 so that the position sensor 1504 properly interprets the driver's intentions. In some embodiments, the controller 1502 can include non-volatile memory (not shown) configured to store driver calibration and adjustment settings for the various sensors as well as default side-view mirror angles. The controller 1502 can be configured to recall and apply the calibration and adjustment settings each time the vehicle is turned on. The memory can be further configured to store calibration and adjustment settings for a plurality of drivers, each of which can be individually and selectably recalled by the controller 1502.

The controller 1502 coupled to the position sensor 1504 installed inside the cabin monitors the natural reactions of the driver to determine the driver's intent. The position sensor 1504 provides measurements regarding the driver's position relatively to the vehicle seat/headrest. In some embodiments, the position sensor 1504 can be a proximity sensor that registers distance between itself and an object (i.e., the driver) or the position sensor 1504 may be an image sensor, such as a CCD sensor or a CMOS sensor, configured to register the driver's posture, arm and hand gestures, and head movements. The image sensor may further be configured to identify eye movements.

In embodiments in which the position sensor 1504 is an image sensor, the controller 1502 can be configured to apply a "body language" deciphering algorithm to the driver's motion patterns and gestures, that can be implemented using machine learning. In such embodiments, the controller 1504 can provide additional functionality based on the driver's movements and gestures, and the accessory devices connected through the accessory ports.

The side view system 1722 in a normal driving position is configured and oriented to image a region to the rear and side of the car. In order to expand such field of view, a side view mirror 1724 may have a tilting mechanism, including a mirror adjustment motor 1522, allowing the driver to expand the field of view when needed by tilting the mirror outwards. To accomplish a larger field of view, the side view system housing can include a rear facing camera 1726 oriented to eliminate driver's blind spot.

Moreover, in embodiments, the controller 1502 can communicates with a GPS system 1730 to provide the user with navigation maps and routes. Additionally, the controller 1502 can be configured to analyze the data from the GPS system 1730, navigation maps and a route being traveled by the vehicle to determine driver intentions, such as, for example, whether the driver will be switching lanes.

Some embodiments include a side-view mirror 1724 in which the tilt angle of the mirror is controllable by the controller 1502 based on the posture, gestures and movements of the driver, to provide an enlarged side visual field to the driver. The controller 1502 is configured to interpret the driver's intentions by analysis of the received signals from the sensors reflecting the driver's motion relatively to the driver's headrest/seat, and activate or deactivate the LCBSA accordingly.

Embodiments of the LCBSA can include a tiltable side view mirror 1724. Other embodiments can include a side view mirror 1724 and a camera 1726 disposed in the side view system 1722. The camera can be positioned to cover an area close to the side and rear of the car. A display screen 1522 is also provided to display the camera 1726 video feed.

Still other embodiments can be equipped with a rear facing camera, in place of a side view mirror, positioned to cover an area close to the side of the car and a display screen that displays camera video feed. Still other embodiments can be equipped with a rear facing camera, in place of a side view mirror, positioned to cover an area close to the side of the car and a display screen that displays camera video feed. In some embodiments, the video feed can be configured as a picture-in-picture arrangement where a main video feed changes from a normal (e.g., default) field of view to a wide field of view during lane changes. When the main video feed is a normal field of view, a secondary video feed presented in a sub region of the display screen provides a wide field of view as well. In this embodiment each side view assembly can be equipped with two cameras, one of each feed. Alternatively, one camera can be used that provides a wide field of view. The video feed is appropriately copied and formatted to provide both a wide field of view and a normal field of view.

The position sensor 1504 detects the movement of the driver relative to the seat back or headrest. When the driver moves his head/upper body or performs body gestures, the position sensor 1504 perceives the "body language" of the driver and sends information to the controller 1502, which compares the driver's movement to the predefined body gestures and determines how to react.

The LCBSA helps to increase safety level by providing adequate visible field when the vehicle is changing lane. When the driver changes lane, the tilted side view mirror 1724 and/or the side-rear camera 1726 should be activated.

Figure 18:
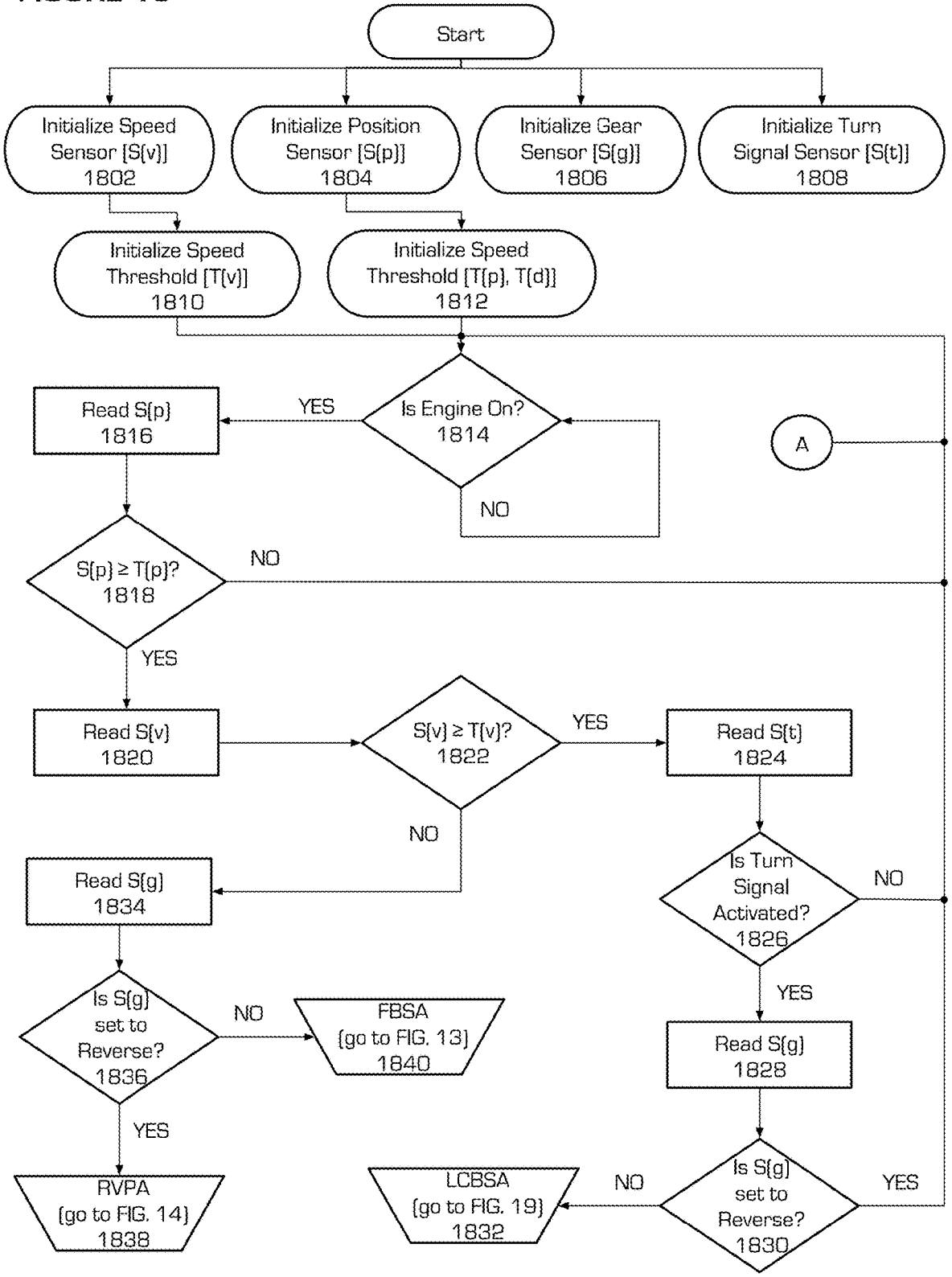
FIGS. 18 and 19 illustrate a process in accordance with an embodiment of the present disclosure.

Referring to FIG. 18, an embodiment of the present disclosure performs the process illustrated therein. In the present embodiment, a process for providing vehicle collision avoidance begins once a driver turns the ignition key to the accessory position, with initialization of a vehicle speed sensor (S(v)), such as, for example, speed sensor 1506 shown in FIG. 17, at step 1802. In addition, a position sensor (S(p)), such as, for example, position sensor 1504 shown in FIG. 17, is initialized in step 1804. The position sensor (S(p)) 1504 is configured to determine the position of the driver's head with respect to a predefined point on the driver's seat. As described above, in an embodiment of the present disclosure, the predefined point is located on the driver's headrest. Additionally, a gear sensor (S(g)), such as, for example, gear sensor 1510 shown in FIG. 17, is initialized at step 1806. The gear sensor (S(g)) 1510 determines the gear that the vehicle is in. Specifically, the gear sensor (S(g)) 1510 determines whether the vehicle is in a reverse gear or a non-reverse gear (i.e., neutral or a forward gear). Also, a turn signal activation sensor (S(t)), such as, for example, signal sensor 1708 shown in FIG. 17, is initialized at step 1808. The turn signal sensor is configured to determine when the R/L turn signal is activated.

The process proceeds to step 1810 where the process initializes a speed threshold (T(v)). The speed threshold (T(v)) is set to a value indicative of situations involving parking, pulling out of a parking space, cautiously entering an intersection or other similar scenarios. In cases where the GPS unit 1730 detects that the vehicle is in situation involving parking (car and road direction are not parallel), pulling out of a parking space, entering an intersection, or other similar scenarios, then, the threshold value can be shifted down to 0 mph. Thus, the system can be responsive to the driver's intentions at all speeds. If GPS position and map data are not enough to determine the corresponding mirror/camera, both mirrors/cameras can be engaged. For example, a car approaching a junction at a small corner, The driver may activate the left turn signal, but the driver requires the right mirror, the system will adjust the right side view as well. Such a scenario is illustrated in FIG. 22, where vehicle 2202 is attempting to turn left onto a cross-street 2204. However, in order to safely execute the left turn, the driver of vehicle 2202 must be aware of cross-traffic vehicles 2206 that are on the right side of the vehicle 2202. Consequently, the right side-view mirror or camera is adjusted to provide a viewing angle that overlaps the cross-traffic vehicles 2206 as well. In one embodiment the speed threshold (T(v)) may be set to any value below 10 miles per hour, and in another embodiment the speed threshold (T(v)) may be set to 5 miles per hour.

The process then proceeds to initialize position thresholds (T(p), T(d)) in step 1812. The position activation threshold (T(p)) defines the minimum distance between the driver's head and the predefined point on the driver's seat at which the process will activate a collision avoidance driving scenario. The position deactivation threshold (T(d)), on the other hand, defines a maximum distance from the predefined point on the driver's seat at which the process will deactivate any driver Assistance System. Thus, the position deactivation threshold (T(d)) has a value less than the position activation threshold (T(p)).

Consequently, when a driver leans forward such that the driver's head surpasses the position activation threshold (T(p)), the collision avoidance system activates in accordance with the present disclosure and remains active until the driver resumes a normal driving position once again as determined by the driver's head being closer to the predefined point on the driver's seat than the position deactivation threshold (T(d)).

Upon completing the initialization steps 1802 through 1812, the process checks whether the vehicle engine is on in step 1814. If the engine is not on, the process enters a loop that either continuously or intermittently performs the check in step 1814. However, if the engine is on, the process proceeds to step 1816 where the position sensor (S(p)) 1504 is read. In step 1818, the value read from the position sensor (S(p)) 1504 is compared to the position activation threshold (T(p)). If the value read from the position sensor (S(p)) 1504 is less than the position activation threshold (T(p)), the process enters a loop returning back to step 1814.

Alternatively, if the value read from the position sensor (S(p)) 1504 is greater than or equal to the position activation threshold (T(p)), the processes continues to step 1820. At step 1820 the process reads the value from the speed sensor (S(v)) 1510. In step 1822, the value read from the speed sensor (S(v)) 1510 is compared to the speed threshold (T(v)). If the value read from the speed sensor (S(v)) 1510 is greater than or equal to the speed threshold (T(v)), the process continues to read the turn signal sensor (S(t)) 1708 in step 1824. In configurations where the speed threshold (T(v)) is set to zero, the process proceeds to 1824 when the value read from the speed sensor (S(v)) 1510 is greater than zero—the value of the speed threshold (T(v)). If the turn signal sensor is not activated in step 1826, the process enters a loop returning back to step 1814. If a turn signal is activated, then the gear position sensor (S(g)) 1510 is read in step 1828 to determine if the car is in reverse gear in step 1830. If reverse gear is selected, the process enters a loop returning back to step 1814. In a case where reverse gear is not selected, Lane Change Blind Spot Assist (LCBSA) is activated in step 1832, which is further described below with reference to FIG. 19.

However, if in step 1822 the value read from the speed sensor (S(v)) 1506 is less than the speed threshold (T(v)), the process continues to step 1834. In configurations where the speed threshold (T(v)) is set to zero, the process proceeds to 1834 when the value read from the speed sensor (S(v)) 1510 is equal to the speed threshold (T(v)), namely equal to zero. At step 1834, the gear position is read from the gear sensor (S(g)) 1510, which is used to determine if the vehicle is in a forward gear or a reverse gear at step 1836. If the vehicle is in reverse gear, the process proceeds to step 1838 to activate the Rear View Parking Assistance System (RVPA), which is described above with reference to FIG. 14. However, if the vehicle is not in reverse gear, the process proceeds to step 1840 to activate the Forward Blind Spot Assistance system (FBSA), which is further described above with reference to FIG. 13.

As apparent to one of ordinary skill in the art, the various sensors and activations may be arranged in alternative configurations as appropriate for a particular implementation. For example, a reverse gear check may be provided prior to the engine check step 1814 such that the system immediately activates the reverse view camera upon placing the vehicle in reverse gear regardless of the status of the engine.

Further, the reverse gear check, as well as any or all of the other sensors checks, may operate in parallel, i.e., simultaneously and continuously, such that the present invention reacts to changes received from the sensors as they occur rather than being limited to a sequential process flow. The above modifications, as well as any other modification as known to one of ordinary skill in the art, are not considered as departing from the present disclosure.

Figure 19:
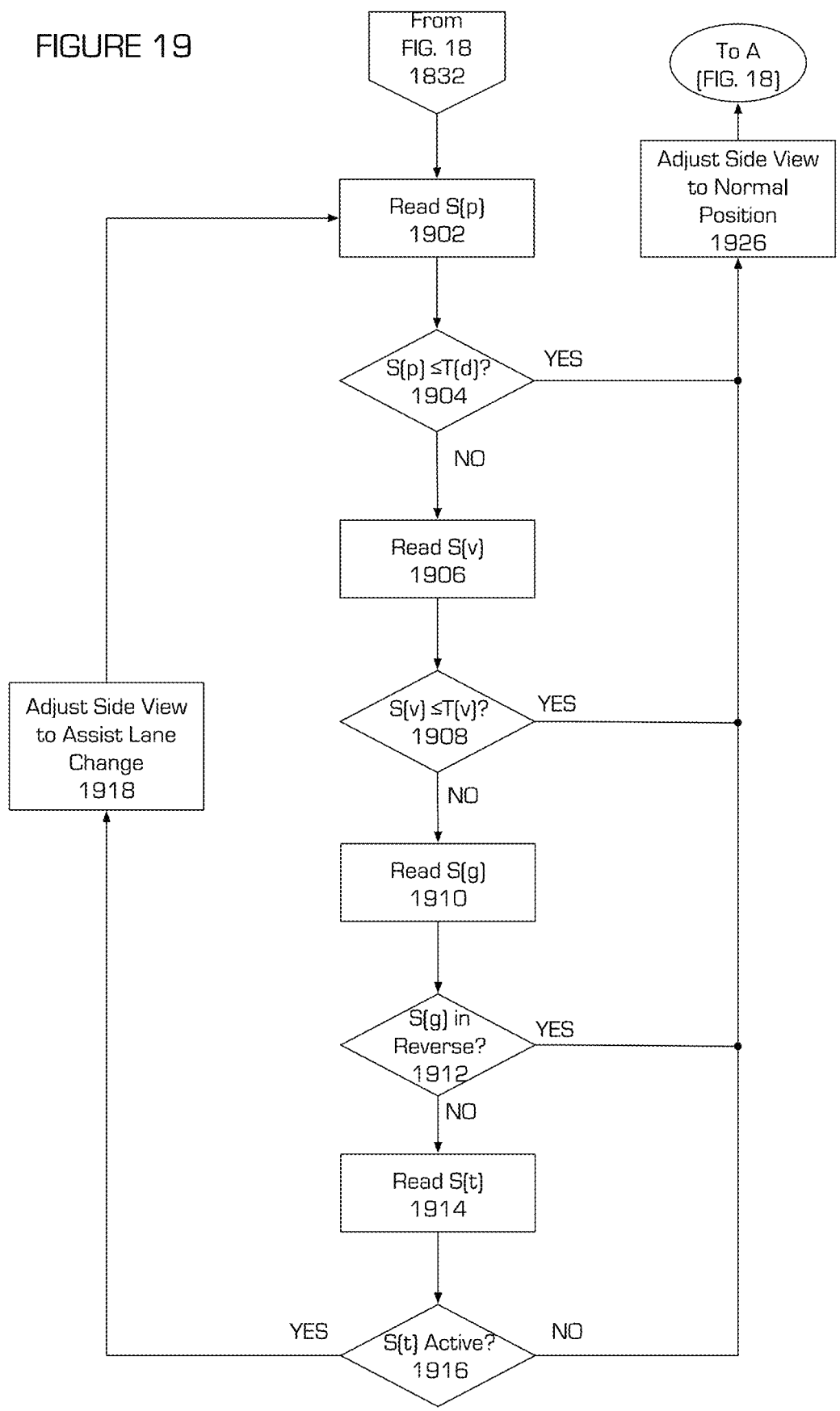

Referring to FIG. 19, in a case where the process described above with reference to FIG. 18 determines that no reverse gear is selected in step 1830, the process continues to step 1832, where the process proceeds to step 1902 and reads the value from the position sensor S(p) 1504. In step 1904 the value from the position sensor S(p) 1504 is compared to the position deactivation threshold T(d). If the value of the position sensor S(p) 1504 is less than or equal to the position deactivation threshold T(d), the process proceeds to step 1926 where the Lane Change Blind Spot Assist is deactivated and the R/L side view mirror 1724 returns to a normal driving position. Once the Lane Change Blind Spot Assist is deactivated, the process continues to step 1928, which loops back to step 1814 in FIG. 18.

However, if the value from the position sensor (S(p)) 1504 exceeds the position deactivation threshold (T(d)) in step 1904, the process continues to step 1906 where the value of the speed sensor (S(v)) 1506 is read. The process then compares the value of the speed sensor (S(v)) 1506 to the speed threshold (T(v)) in step 1908. If the value of the speed sensor (S(v)) 1506 is less than or equal to the speed threshold (T(v)), the process proceeds to step 1926 where the Lane Change Blind Spot Assistance system is deactivated. Once the Lane Change Blind Spot Assistance system is deactivated the process continues to step 1928, which loops back to step 1814 in FIG. 18.

However, if the value from the speed sensor (S(v)) 1506 is greater than the speed threshold (T(v)) in step 1908, the process continues to step 1910 where the value of the gear sensor (S(g)) 1510 is read. The process then determines if the gear sensor (S(g)) 1510 indicates that the vehicle is in reverse or non-reverse gear in step 1912. If the vehicle is determined to be in a reverse gear the process proceeds to step 1926 where the Lane Change Blind Spot Assistance system is deactivated and the process loops back to step 1814 in FIG. 18. In some embodiments a second speed threshold ($T(v_2)$) can be implemented that is associated with a speed range indicative of parking maneuvers, for example, the second speed threshold ($T(v_2)$) can be set for slow speeds (e.g., 0 to 5 mph).

If the vehicle is determined to be in a non-reverse gear, the process proceeds to step 1914 where the system reads the turn signal sensor 1708. If the turn signal 1708 is not activated then the process proceeds to step 1926 where the Lane Change Blind Spot Assistance system is deactivated and the process loops back to step 1814 in FIG. 18.

However, if it is determined that a turn signal is activated by the driver in step 1916, the process proceeds to step 1918 where the side view mirror corresponding to the activated flash direction is tilted outwards to facilitate the lane change by eliminating the blind spot on that side of the car. In embodiments in which cameras 1726 are installed in the side view system 1722, the controller 1502 can cause the camera 1726 to angle towards the blind spot direction. In other embodiments in which cameras 1726 are installed in the side view system 1722, the controller 1502 can alter the field of view of the camera 1726 to include the blind spot. In some embodiments, the vehicle is equipped with both a side mirror 1724 and side camera 1726, and the controller 1502 activates the camera 1726 and a corresponding monitor.

Figure 21:
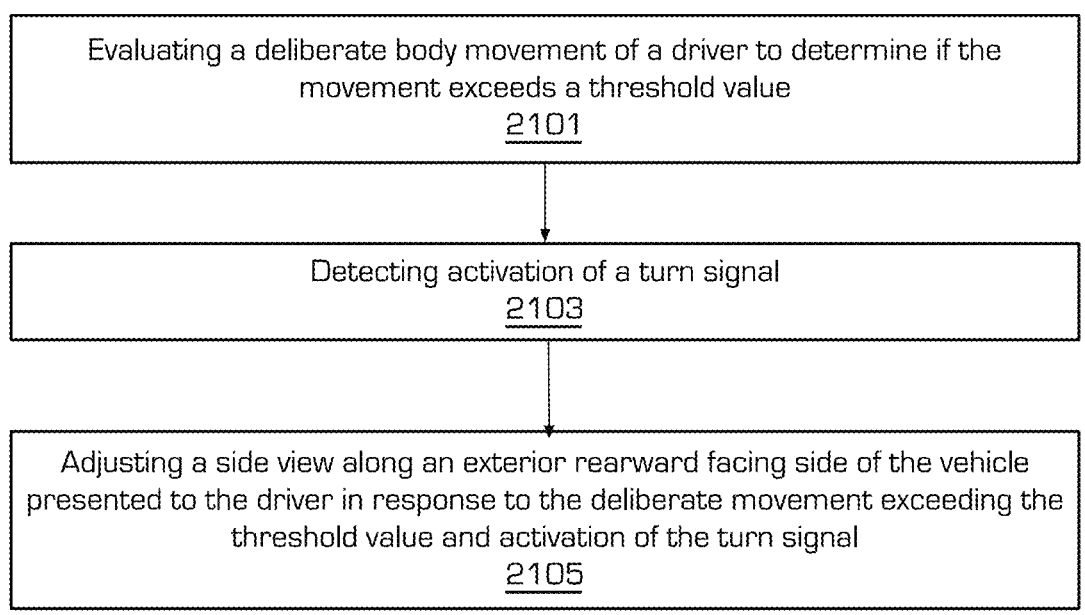
FIG. 21 illustrates a process in accordance with an embodiment of the present invention.

Turning to FIG. 21, another method is shown. The embodiment shown in FIG. 21 begins at 2101 by evaluating a detected deliberate body movement of a driver to determine if the deliberate body movement exceeds a threshold value. At 2103, the process detects activation of a turn signal, and at 2105 the process adjusts a side view along an exterior rearward facing side of the vehicle presented to the driver in response to the deliberate body movement exceeding the threshold value and activation of the turn signal. The deliberate body movement evaluated at 2101 can be a head movement, and the threshold value relates to an angle of the head movement relative to a forward head position. Additionally, the process can detect whether the motor vehicle is in a non-reverse gear and adjust the side view to a normal view when the vehicle is in the non-reverse gear. The side view, in the present embodiment, can be provided by a mirror coupled to a motor configured to control an angle of the mirror to adjust the side view presented to the driver. Alternatively, the side view can be provided by a camera coupled to a display. The camera can have an adjustable field of view. The side-view camera can be configured to provide a view along an exterior side of the vehicle.

Additionally, the process can be configured to detect whether the vehicle is in a reverse gear. The process can be configured to, when in reverse gear, adjust a side-view to provide a side parking view to the driver when the body motion exceeds the threshold value; and adjust the side-view to provide a normal driving view to the driver when the body motion is less than the threshold distance and greater than the second threshold value.

Those of ordinary skill would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the disclosure.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present disclosure. Various modifications to these exemplary embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A vehicle collision avoidance system comprising:
a side-view camera positioned on a side portion of a vehicle, the side-view camera configured to present a driver with a rear side view exterior to the vehicle;
a display coupled to the side-view camera and disposed in view of the driver to output a video stream from the side-view camera;
a position sensor arranged to detect a deliberate movement of the driver indicative of the driver's intention to improve side view visibility;
a turn signal sensor configured to detect activation of a turn signal; and
a controller configured to receive signals from the position sensor and the turn signal sensor, and to adjust a field of view of the side-view camera based on the detection by the position sensor and activation of the turn signal.

2. The vehicle collision avoidance system as in claim 1, wherein the field of view of the side-view camera is adjusted to improve side view visibility when the controller receives signals indicating the deliberate movement of the driver and the activation of the turn signal.

3. The vehicle collision avoidance system as in claim 1, further comprising a global positioning system (GPS) unit and digital navigation maps.

4. The vehicle collision avoidance system as in claim 3, wherein the controller identifies a potential lane change situation based on current vehicle position data from the GPS unit, and routing data from the navigation maps, and adjusts the side view to facilitate the lane change.

5. The vehicle collision avoidance system as in claim 1, wherein the display is disposed in a side view housing on an interior door pillar of the vehicle and in line with a side view direction.

6. The vehicle collision avoidance system as in claim 1, wherein the side-view camera further comprises a right-side camera and a left-side camera positioned at respective sides of the vehicle.

7. The vehicle collision avoidance system as in claim 6, wherein the display further comprises a right-side display and a left-side display coupled to the right-side camera and the left-side camera, respectively, the right-side display being disposed on a right-side interior door pillar of the vehicle, and the left-side display being disposed on a left-side interior door pillar of the vehicle.

8. A vehicle collision avoidance system comprising:
a side-view mirror positioned on a side portion of a vehicle, the side-view mirror configured to present a driver with a rear side view exterior to the vehicle;
a motor coupled to the side-view mirror and configured to controllably adjust an angle of the side-view mirror;
a position sensor arranged to detect a deliberate movement of the driver indicative of the driver's intention to improve side view visibility;
a turn signal sensor configured to detect activation of a turn signal; and
a controller configured to receive signals from the position sensor and the turn signal sensor, and to control the motor to adjust an angle of the side-view mirror based on the detection by the position sensor and activation of the turn signal.

9. The vehicle collision avoidance system as in claim 8, wherein the angle of the side-view mirror is adjusted to improve side view visibility when the controller receives signals indicating the deliberate movement of the driver and the activation of the turn signal.

10. The vehicle collision avoidance system as in claim 8, wherein the side-view mirror further comprises a right-side mirror and a left-side mirror positioned at respective sides of the vehicle.

11. The vehicle collision avoidance system as in claim 8, further comprising a global positioning system (GPS) unit and digital navigation maps.

12. The vehicle collision avoidance system as in claim 11, wherein the controller identifies a potential lane change situation based on current vehicle position data from the GPS unit, and routing data from the navigation maps, and adjusts the side view to facilitate the lane change.

13. A vehicle collision avoidance method for a motor vehicle, comprising:
evaluating a detected deliberate body movement of a driver to determine if the deliberate body movement exceeds a threshold value;
detecting activation of a turn signal; and
adjusting a side view along an exterior rearward facing side of the vehicle presented to the driver in response to the deliberate body movement exceeding the threshold value and activation of the turn signal.

14. The method as in claim 13, wherein the deliberate body movement is a head movement, and the threshold value relates to an angle of the head movement relative to a forward head position.

15. The method as in claim 14, wherein the collision avoidance process further comprising:
detecting whether the motor vehicle is in a reverse gear or a non-reverse gear;
adjusting the side view to a normal view when the vehicle is in the reverse gear.

16. The method as in claim 13, wherein side view is provided by a mirror coupled to a motor configured to control an angle of the mirror to adjust the side view presented to the driver.

17. The method as in claim 13, wherein the side view is provided by a camera coupled to a display, the camera having an adjustable field of view.

18. The method as in claim 17, wherein the side-view camera is configured to provide view along an exterior side of the vehicle.

19. The method as in claim 17, wherein:
the side-view camera is configured to provide a normal view to the driver when the deliberate body motion is less that the threshold value; and
the side-view camera is configured to provide a wide angle view to the driver when the deliberate body motion exceeds the threshold value.

20. A vehicle collision avoidance system, comprising:
a first sensor configured to determine deliberate body movement;
a second sensor configured to detect a transmission gear selection;
a third sensor configured to sense a traveling velocity of the vehicle;
a turn signal sensor configured to detect activation of a turn signal;

a first camera system positioned at a front-most position on the vehicle and oriented to image an area encompassing at least 180° around the front of said vehicle;

a second camera system positioned at a rear-most position on the vehicle;

a first display adapted to display video from the first camera and the second camera to the driver;

a side-view camera positioned on a side portion of a vehicle, the side-view camera configured to present a driver with a rear side view exterior to the vehicle;

a second display coupled to the side-view camera and disposed in view of the driver to output a video stream from the side-view camera; and a controller configured to:
  interpret received signals from the first sensor, the second sensor, and the third sensor;
  select a video feed from at least one of the first camera and the second camera based on the received signals, and display the video feed on the first display; and
  adjust a field of view of the side-view camera based on activation of the turn signal and the received signals.

21. A vehicle collision avoidance method for a motor vehicle, comprising:
  detecting whether the vehicle is in a reverse gear;
  evaluating a detected deliberate body movement of a driver to determine if the deliberate body movement exceeds a threshold value; and
  adjusting a side view along an exterior rearward parking view of the vehicle presented to the driver in response to the vehicle being in the reverse gear and the deliberate body movement exceeding the threshold value.

22. The method as in claim 21, wherein the deliberate body movement is a head movement, and the threshold value relates to a distance of the head movement relative to a forward head position.

23. The method as in claim 21, further comprising:
  adjusting a side-view to provide a side parking view to the driver when the body movement exceeds the threshold value; and
  adjusting the side-view to provide a normal driving view to the driver when the body movement is less than the threshold value.

24. The method as in claim 23, wherein the side parking-view and the side normal-view is provided by a camera coupled to a display, the camera having an adjustable field of view.

25. The method as in claim 23, further comprising the step of detecting the vehicle's velocity to be under a speed threshold; and wherein the side view along an exterior rearward parking view of the vehicle presented to the driver is further adjusted in response to the vehicle's velocity being under the speed threshold.

* * * * *